US010044649B2

(12) United States Patent
Sirpal et al.

(10) Patent No.: US 10,044,649 B2
(45) Date of Patent: Aug. 7, 2018

(54) SYSTEMS AND METHODS FOR CONNECT TO CONTROL

(71) Applicants: Jamdeo Canada Ltd., Oakville (CA); Qingdao Hisense Electronics Co., Ltd., Qingdao, Shandong (CN); Hisense USA CORP., Suwanee, GA (US); Hisense International Co., Ltd., Qingdao (CN)

(72) Inventors: Sanjiv Sirpal, Oakville (CA); Mohammed Selim, Oakville (CA); Alexander De Paz, Burlington (CA); Salvador Soto, Toronto (CA); Sergii Grysenko, Burlington (CA)

(73) Assignees: JAMDEO CANADA, LTD., Oakville, CA (US); HISENSE USA CORP., Suwanee, GA (US); QINGDAO HISENSE ELECTRONICS CO., LTD., Qingdao (CN); HISENSE INTERNATIONAL CO., LTD., Qingdao (CN)

( * ) Notice: Subject to any disclaimer, the term of this patent is extended or adjusted under 35 U.S.C. 154(b) by 203 days.

(21) Appl. No.: 14/829,942

(22) Filed: Aug. 19, 2015

(65) Prior Publication Data
US 2016/0234140 A1 Aug. 11, 2016

Related U.S. Application Data

(60) Provisional application No. 62/113,225, filed on Feb. 6, 2015.

(51) Int. Cl.
*G06F 15/16* (2006.01)
*H04L 12/58* (2006.01)
(Continued)

(52) U.S. Cl.
CPC ............ *H04L 51/046* (2013.01); *G06F 3/017* (2013.01); *G06F 3/0481* (2013.01);
(Continued)

(58) Field of Classification Search
CPC ............... H04L 51/046; H04L 41/0803; H04L 41/0806; H04L 41/22; H04L 67/303; H04L 67/306
(Continued)

(56) References Cited

U.S. PATENT DOCUMENTS 7,162,238 B1 * 1/2007 Massie .................. H04W 24/00
455/428
8,316,237 B1 * 11/2012 Felsher ................. H04L 9/0825
380/282

(Continued)

*Primary Examiner* — Davoud Zand
(74) *Attorney, Agent, or Firm* — Gordon & Rees LLP

(57) ABSTRACT

The present disclosure relates to systems, methods, devices and applications for connection and control of devices. In one embodiment, a method includes transmitting a discover message by a discovery engine of an application executed by the device, receiving a response message from a second device, transmitting a request to the second device for a profile and receiving an acknowledgement of the request for profile for the second device. The method can also include transmitting a request for capabilities associated with the second device, receiving acknowledgement of the request for capabilities, and transmitting a control command to the second device formatted by the application based on the acknowledgement of the request for profile. Other embodiments are directed to receiving discover messages, requests for profile information and capabilities and establishing a communication channel between devices.

21 Claims, 12 Drawing Sheets

(51) Int. Cl.

| | |
|---|---|
| *H04L 29/08* | (2006.01) |
| *G06F 3/0482* | (2013.01) |
| *G06F 3/0484* | (2013.01) |
| *G06F 3/0485* | (2013.01) |
| *H04L 12/24* | (2006.01) |
| *G06F 3/0488* | (2013.01) |
| *G06F 3/0481* | (2013.01) |
| *G06F 3/01* | (2006.01) |
| *G06F 3/14* | (2006.01) |
| *G09G 5/00* | (2006.01) |
| *H04N 21/426* | (2011.01) |
| *H04N 21/458* | (2011.01) |
| *H04N 21/482* | (2011.01) |
| *H04N 21/488* | (2011.01) |
| *H04N 21/81* | (2011.01) |
| *H04N 21/4402* | (2011.01) |
| *H04N 21/442* | (2011.01) |
| *H04N 21/45* | (2011.01) |
| *H04L 12/28* | (2006.01) |

(52) U.S. Cl.
CPC .......... *G06F 3/0482* (2013.01); *G06F 3/0485* (2013.01); *G06F 3/04817* (2013.01); *G06F 3/04842* (2013.01); *G06F 3/04845* (2013.01); *G06F 3/04847* (2013.01); *G06F 3/04883* (2013.01); *G06F 3/1415* (2013.01); *G09G 5/005* (2013.01); *H04L 12/2807* (2013.01); *H04L 41/0806* (2013.01); *H04L 41/12* (2013.01); *H04L 41/22* (2013.01); *H04L 67/303* (2013.01); *H04L 67/306* (2013.01); *H04N 21/42653* (2013.01); *H04N 21/4402* (2013.01); *H04N 21/44227* (2013.01); *H04N 21/458* (2013.01); *H04N 21/4516* (2013.01); *H04N 21/4826* (2013.01); *H04N 21/4882* (2013.01); *H04N 21/812* (2013.01); *G09G 2354/00* (2013.01)

(58) Field of Classification Search
USPC ................ 709/201, 202, 203, 204, 205, 206
See application file for complete search history.

(56) References Cited

U.S. PATENT DOCUMENTS

| | | | | |
|---|---|---|---|---|
| 9,437,105 | B2* | 9/2016 | Arling | G08C 19/00 |
| 9,671,851 | B2* | 6/2017 | Luna | G06F 1/3231 |
| 2009/0065571 | A1* | 3/2009 | Jain | G06K 19/07739 |
| | | | | 235/379 |
| 2013/0204962 | A1* | 8/2013 | Estevez | H04N 7/185 |
| | | | | 709/217 |
| 2014/0162598 | A1* | 6/2014 | Villa-Real | H04M 1/66 |
| | | | | 455/411 |
| 2015/0118958 | A1* | 4/2015 | Jain | G06Q 20/204 |
| | | | | 455/41.1 |
| 2015/0127733 | A1* | 5/2015 | Ding | H04W 4/08 |
| | | | | 709/204 |
| 2016/0103911 | A1* | 4/2016 | Logue | H04L 67/141 |
| | | | | 707/695 |

* cited by examiner

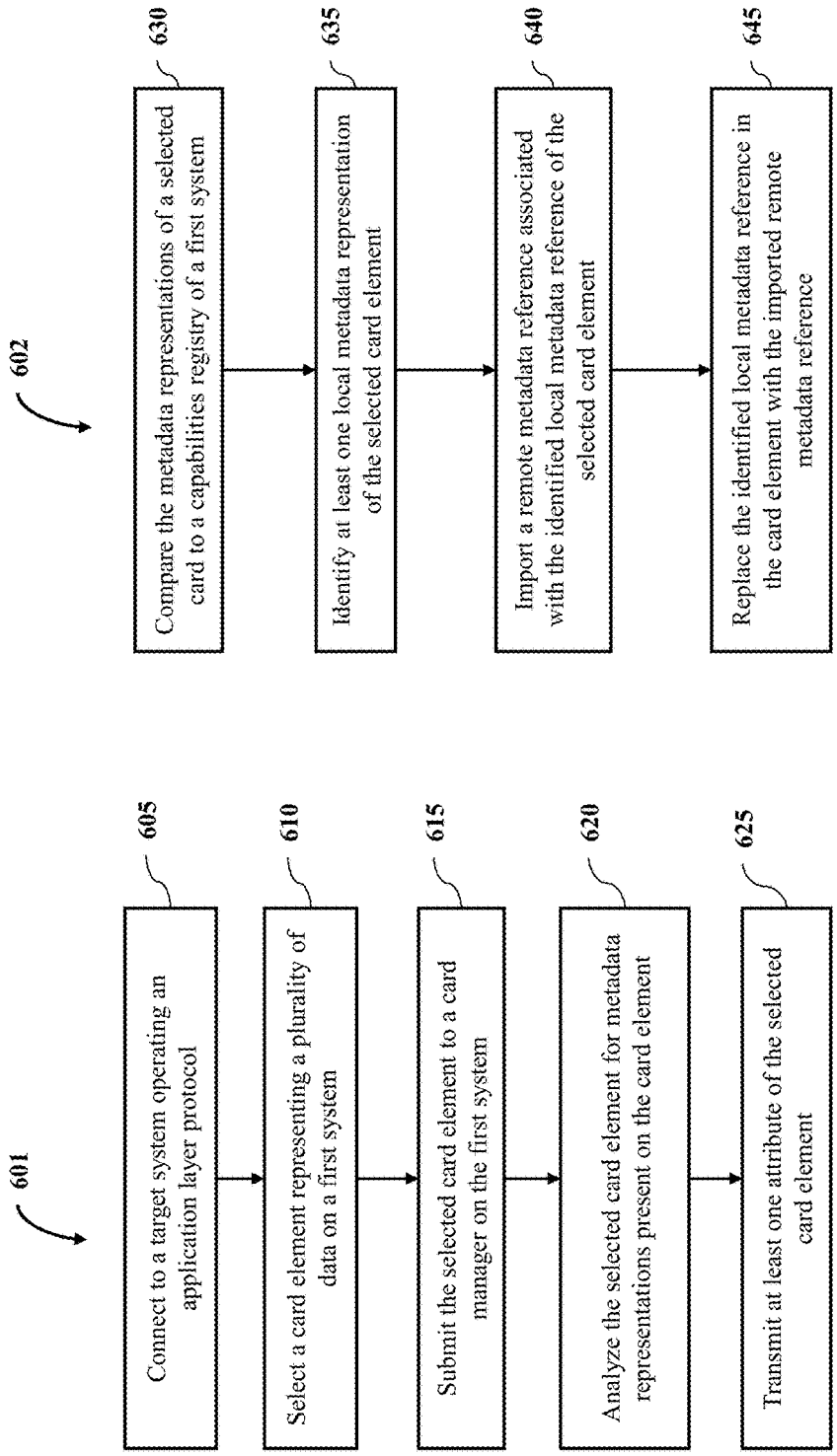

SYSTEMS AND METHODS FOR CONNECT TO CONTROL

CROSS REFERENCES TO RELATED APPLICATIONS

This application claims the benefit of U.S. provisional patent application No. 62/113,225 filed Apr. 13, 2014, entitled "SYSTEM AND METHODS FOR AN APPLICATION CONFIGURATION AND PRESENTATION," which is hereby incorporated by reference in its entirety.

This application is related to the concurrently filed applications entitled: SYSTEM AND METHODS FOR APPLICATION USER INTERFACE PRESENTATION AND CARD ELEMENTS filed on Aug. 19, 2015 and assigned patent application Ser. No. 14/829,955; SYSTEM AND METHODS FOR CARD ELEMENT APPLICATION OPERATION filed on Aug. 19, 2015 and assigned patent application Ser. No. 14/829,893; SYSTEM AND METHODS FOR CARD EXCHANGE AND USER INTERFACE PRESENTATION filed on Aug. 19, 2015 and assigned patent application Ser. No. 14/829,904; SYSTEM AND METHODS FOR CONTROL OF CARD ELEMENTS WITHIN AN APPLICATION USER INTERFACE filed on Aug. 19, 2015 and assigned patent application Ser. No. 14/829,914; SYSTEM AND METHODS FOR CARD INTERACTION AND ASSIGNING CARDS TO DEVICES filed on Aug. 19, 2015 and assigned patent application Ser. No. 14/829,923; SYSTEM AND METHODS FOR CARD INTERACTION AND ASSIGNING CARDS TO SPACES filed on Aug. 19, 2015 and assigned patent application Ser. No. 14/829,930; SYSTEMS AND METHODS FOR DEVICE TO DEVICE CONTROL filed on Aug. 19, 2015 and assigned patent application Ser. No. 14/829,955; SYSTEM AND METHODS FOR SETTINGS CARDS filed on Aug. 19, 2015 and assigned patent application Ser. No. 14/829,970; and SYSTEM AND METHODS FOR PRESENTATION OF A USER INTERFACE AND CARD ELEMENTS filed on Aug. 19, 2015 and assigned patent application Ser. No. 14/829,986, the disclosures of which are expressly incorporated by reference.

FIELD

The present disclosure relates to electronic devices and applications, and more particularly to systems, devices and methods for exchanging card elements comprising data between systems.

BACKGROUND

Devices and systems increasingly operate on digital landscapes to control their operations. Communication with and control of these devices and systems is often done through protocols and languages that are frequently unique to the device and system. Conventional devices and systems are preconfigured for particular communication arrangements that do not facilitate communication with other devices and systems that do not share similar prearranged communication protocols. There exists a desire for improved connectivity and exchange relative to devices.

BRIEF SUMMARY OF THE EMBODIMENTS

Disclosed herein are methods, devices and systems for connection and control of devices. In one embodiment, a method includes transmitting, by a device, a discover message, wherein transmission of the discover message is controlled by a discovery engine of an application executed by the device, receiving, by the device, a response message from a second device in response to the discover message, and transmitting, by the device, a request to the second device for a profile associated with the second device, wherein transmission of the request for the profile is controlled by a pairing engine of the application. The method also includes receiving, by the device, an acknowledgement of the request for profile, wherein the acknowledgement of the request for profile includes identification of the second device and profile information for the second device, transmitting, by the device, a request for capabilities associated with the second device, wherein transmission of the request is controlled by a capabilities engine of the application, and receiving, by the device, acknowledgement of the request for capabilities, wherein the acknowledgement of the request for capabilities includes one or more capabilities for the second device. The method also includes transmitting, by the device, a control command to the second device, wherein the control command is formatted by the application based on the acknowledgement of the request for profile, the acknowledgement of the request for capabilities received by the device and at least one plugin of the second device.

In one embodiment, the discover message is a universal discovery message for devices associated with the application.

In one embodiment, the response message is an offer to establish a communication channel between the device and the second device.

In one embodiment, the request for the profile associated with the second device is a request for a configuration profile of the second device including a device class for the second device recognized by the application.

In one embodiment, the acknowledgement of the request for profile includes a universal user identification for the second device recognized by the application and a metadata profile for the second device.

In one embodiment, the request for capabilities associated with the second device includes static capabilities supported by the second device and one or more capabilities stored by the profiling engine for the second device.

In one embodiment, receiving the acknowledgement of the request for capabilities includes at least one capability object associated with accessing an application programming interface for the second device.

In one embodiment, transmitting the control command to the second device includes transmitting a command to activate a control state for the second device.

In one embodiment, the control command is to request data associated with at least one of a setting of the second device, control state of the second device and sensor output of the second device.

In one embodiment, the control command is formatted by the application based in part on a plugin employed by the second device.

One embodiment is directed to a device including an input/output unit configured for communication and a controller coupled to the input/output unit. The controller is configured to control transmitting a discover message, wherein transmission of the discover message is controlled by a discovery engine of an application executed by the device, and receiving a response message from a second device in response to the discover message. The controller is configured to control transmitting a request to the second device for a profile associated with the second device, wherein transmission of the request for the profile is controlled by a pairing engine of the application, and receiving an acknowledgement of the request for profile, wherein the acknowledgement of the request for profile includes identification of the second device and profile information for the second device. The controller is configured to control transmitting a request for capabilities associated with the second device, wherein transmission of the request is controlled by a capabilities engine of the application, and receiving acknowledgement of the request for capabilities, wherein the acknowledgement of the request for capabilities includes one or more capabilities for the second device. The controller is configured to control transmitting a control command to the second device, wherein the control command is formatted by the application based on the acknowledgement of the request for profile, the acknowledgement of the request for capabilities received by the device and at least one plugin of the second device.

In one embodiment, a method includes receiving, by a device, a discover message, wherein the discover message is received from a second device and associated with a pairing engine of an application executed by the device, and transmitting, by the device, a response message to the second device in response to the discover message. The method also includes receiving, by the device, a request for a profile associated with the device, wherein the request for the profile is controlled by a pairing engine of the application, and transmitting, by the device, an acknowledgement of the request for profile, wherein the acknowledgement of the request for profile includes identification of the second device and profile information for the second device. The method also includes receiving, by the device, a request for capabilities associated with the device, wherein the request is controlled by a capabilities engine of the application, and transmitting, by the device, acknowledgement of the request for capabilities, wherein the acknowledgement of the request for capabilities includes one or more capabilities for the second device. The method also includes transmitting, by the device, a control command to the second device, wherein the control command is formatted by the application based on a profile and capabilities of the device and at least one plugin of the second device.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 6A-6B depict a processes according to one or more embodiments;

DETAILED DESCRIPTION OF THE EXEMPLARY EMBODIMENTS

Overview and Terminology

Figure 1:
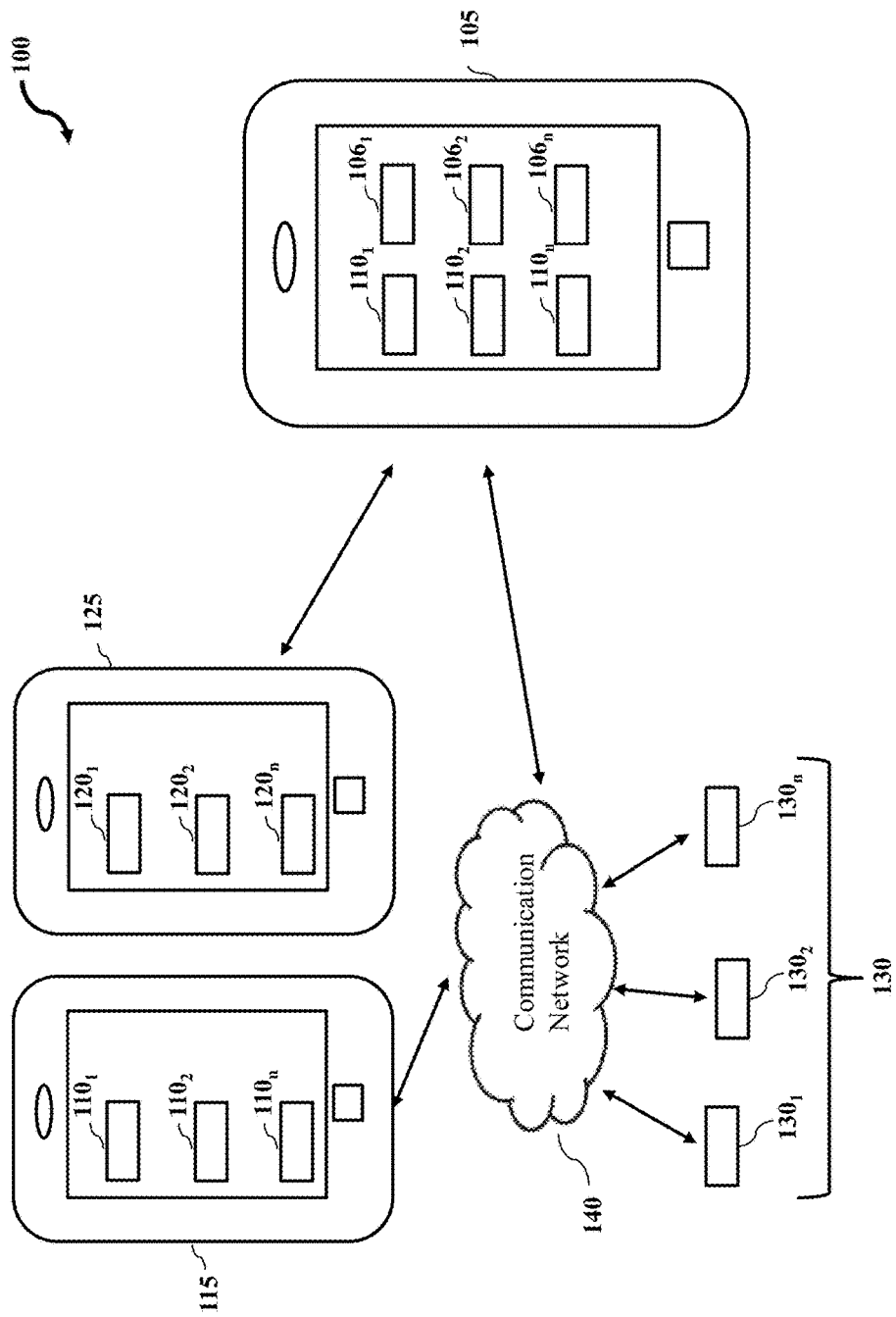
FIG. 1 depicts a simplified system diagram according to one or more embodiments.

One aspect of the disclosure is to provide a system, method, devices and applications for accessing and exchanging information and application program interface data between systems. In one embodiment, the accessed and exchanged data is through a card element comprising information provided by a system or application program interface data for the functions of a system. In one embodiment, an application layer protocol, such as a mobile operating system/experience (mOX) application, facilitates exchanging or accessing the card element.

One aspect of the disclosure is to provide methods and devices for card interaction and assigning cards to devices. In one embodiment, a mobile operating system/experience (MOX) application is provided for card interaction and assigning cards. In another embodiment, a device is disclosed for facilitating card interaction and assigning cards. In another embodiment, a system is provided for allowing card assignment to devices. Other embodiments are directed to presentation of a user interface and processes for method is disclosed for creating the cards for use in the MOX application.

One or more embodiments described herein are directed to communication with devices and interoperability of devices by way of an application configured to execute on the one or more devices. The application, which may be a MOX application, may be configured to present a user interface with graphical elements to represent entities (e.g., devices, spaces, etc.) and card elements. The user interface may also be configured to allow for manipulation of the card elements, such that assignment of a card to a device within the user interfaces results in an association of a card element to the device within the application. In that fashion, representations in the user interface can result in associations of data by devices running the application (e.g., MOX application).

As used herein, a card can relate to graphical elements displayed in a user interface, wherein each card element can allow for one or more of exchange, communication, control and/or application accessibility. Card elements may be associated with one or more types of cards and one or more types of capabilities. A card element may have a data structure associated with each card type, the card providing metadata that can allow an application and/or devices to utilize the card. According to one embodiment, each card element can include a graphical element that is represented by a device and/or can include a data record stored by one or more servers or devices that allow for the card to be shared, transmitted, loaned, exchanged, associated, pulled and/or pushed to one or more devices and spaces. Card elements may define capabilities of devices and/or spaces. Card elements may be associated with devices or spaces that are real or virtual. Card elements may be uniquely identified.

As used herein, a MOX application relates to an application having particular core elements that allow for the application to be executed across many different devices and devices types. The application may be platform agnostic and thus, configurable on one or more operating systems or platform types (e.g., linux, etc.). The MOX application provides connectivity, control and/or communication relative to one or more devices. The MOX application can be operated based on communication with a network and/or pear-to-pear communication among devices. The MOX application may operate within a network or system that is an ecosystem or MOX ecosystem. The MOX application may be deployed on one or more devices, entities or spaces that make up a MOX ecosystem.

According to one embodiment, the MOX system is an application that runs on a mobile device. According to another embodiment, MOX provides a unique user interface with many features. Features of the MOX application can be characterized as user interface (e.g., user experience) features and architectural features. The MOX system incorporates cards. Cards are displayed as visual elements in the user interface that can be manipulated to provide exchange of data, capabilities, and allow for device control. Card elements may be configured as containers.

As used herein, an entity relates to elements that that are recognized and that make up an ecosystem of the application. An entity may relate to a device, space, and users of an application. An ecosystem relates to collections of entities that are associated.

Spaces relate to real and virtual locations that are recognized by the application. By way of example, a space may be assigned to one or more of a room, building, floor, home, office or other physical location (e.g., café, office, etc.). Spaces may also be assigned to virtual locations that do not have a corresponding physical location.

A device can relate to devices configured to execute and run a MOX application. A device can also relate to non-MOX devices. Devices may refer to real and virtual devices.

Architectural aspects of the MOX application relate to the card configuration, platform for operating with mobile device OS, and underlying processes for card exchange functionality.

One embodiment is directed to processes for presentation of a user interface and a device configured to present a user interface, such as MOX, with cards.

Another embodiment is directed to an application platform, processes and devices for operating within a MOX platform. MOX may provide a common UI for multiplatform devices, such as a single unified way to control or know even though devices are not connected. The MOX architecture may include one or more of the following attributes: use of cards as containers, defined card architecture, card based metadata (Json Metadata). MOX may allow for spaces and provide a visual of all spaces based on connection. MOX may include a prioritization algorithm based on proximity, known/history, places with access, etc. MOX may allow for a search of virtual spaces. MOX may be configured with a MOX stack and MOX plugin, and security features. MOX may allow the same card to provide different actions on different devices. MOX may be configured to publish a card into any device (virtual or real).

MOX may operate based on independently defined APIs, which are available via a RESTful interface (similar to the cloud interface). The APIs may be defined by an OEM to support the device.

In certain embodiments, a MOX card itself is an HTML object, containing relevant resources related to color pallet, and branding, as well as the interactive components. Both the front and the back of the card are supplied by the device itself, and are validated by the cloud.

Disclosed herein are methods, devices and systems for accessing, viewing, and exchanging data between systems, the data represented as a packet of information and attributes in a card element on a system. Exchange of card elements may occur by direct connection between devices such over a bus or other hardwire connection, or over a network connection such as local area network or cloud network. Exchange of card elements also varies according to embodiment; in one embodiment a card element is exchanged between two devices, in another embodiment a card element is acquired by a device from a card element store or other database of card elements.

In one embodiment, the exchange of card elements between systems occurs over an application layer protocol, such as the mobile operating experience (mOX) operated across a plurality of systems supporting the same application layer protocol. In one embodiment, the system or platform supporting the application layer protocol is a mobile device (such as a smartphone or tablet computer). In other embodiments the system or platform operating the application layer protocol is a computing device such as a laptop or desktop computer. In other embodiments the system or platform operating the application layer protocol is a fixed device such as an appliance like a microwave or a refrigerator or television. In other embodiments, the system or platform operating the application layer protocol is a virtual device such as a user account accessing the application layer protocol through a platform that does not necessarily host the application layer protocol.

The aforementioned examples of platforms and systems supporting the application layer protocol are illustrative only and not exhaustive. One having skill in the art will envision other systems appropriate for supporting the application layer protocol, or card element communication protocols otherwise, given the examples provided by this disclosure.

A card element in one embodiment is accessed through an interface on a system. In one embodiment, a card element is a data packet representing the intrinsic capabilities of the system hosting the card element. In another embodiment the card element represents the operations and control of a system hosting the card element. In other embodiments, the card element is an exchangeable data packet enabling remote control of the system from an external system that has the same card element either by a receiving method according to one or more embodiments described herein, or from pre-configuration of the external system.

In one embodiment, a card element is a unit of exchange between devices, systems and sources supporting card elements, creating a virtual economy in card elements. According to one or more embodiments, a card element may be pushed from one system to another, pulled from one system to another, or borrowed from or loaned between systems. Exchange of card elements can further be classified as a copy exchange or a move exchange according to various embodiments.

In some embodiments, a card element exchange comprises exchanging only the basic attributes of the card element modeled as metadata associated with values of the card element data. In other embodiments, the exchange includes associated data of the card element attributes and capabilities beyond minimum representations of the card elements to enable further functions of a respective card element.

In one embodiment, the card element is a control card configured to provide the settings controls for unique and persistent functionalities of a system supporting the control card element. In another embodiment, the card element is an interactive card element configured to provide mutable content changes to the interactive card element. In another embodiment, the card element is a shortcut card configured to launch an application or function or intent otherwise external to the application layer protocol. In still other embodiments, the card element is a content card configured to represent documents or other media. In another embodiment, card elements support commenting specific to each card element.

In other embodiments, exchange of a card element is not necessary to access the information within the card element. A card element is available for access and manipulation of capabilities it may support without transfer of all card element data to a system that wants to access or manipulate the card element. Such access and manipulation permits remote control of the card element; whereas other embodiments enable exchange of card elements to enable remote control of the device or system related to the card element.

One embodiment is a method for exchange by delivering, or pushing, a card element from one system to another. A first system connects to a target system, and the first system initiates transfer of a card element from the first system to the target system.

In one embodiment, a method includes viewing card elements of external sources, such as remote devices or cloud databases of card elements. Other embodiments are directed to a method for receiving, or pulling, a specific card element from an external source. In one embodiment, an interface on a first system displays at least one card element of an external source according to a method for viewing card elements according to various embodiments described in this disclosure. The displayed card element is selected by the first system or a user of the first system for transfer of the displayed card element to the first system from the external source. The displayed card is transferred to the first system, and accessed through the interface of the first system.

In one embodiment, differences between end point values of shared card elements, previously delivered and received card elements, or previously hosted card elements on a receiving system, that are updated by a card element exchange are reconciled by an application layer protocol of the receiving system to produce an updated card element incorporating the data of the received card element.

Other embodiments comprise systems for delivering a card element to an external source, systems for viewing card elements of external devices or systems connected to a first device, and systems for receiving a card element from an external device or system.

Other embodiments are directed to the components of a card element, and the specific layers comprising a card element configured to perform a given capability, provide given information, or share certain attributes according to the embodiment.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Disclosed herein are methods, devices and systems for accessing, viewing, and exchanging data between systems, the data represented as a packet of information in a card element. Access to, or exchange of, card elements may occur by direct connection between devices such as over a bus or other hardwire connection, or over a network connection such as local area network or cloud network. Exchange of card elements also varies according to embodiment; in one embodiment a card element is exchanged between two devices, in another embodiment a card element is acquired by a device from a card element store or other database of card elements.

In one embodiment, the access or exchange of card elements between systems occurs over an application layer protocol, such as the mobile operating experience (mOX), across a plurality of systems supporting the same application layer protocol. In one embodiment, the system or platform supporting the application layer protocol is a mobile device (such as a smartphone or tablet computer). In other embodiments the system or platform operating the application layer protocol is a computing device such as a laptop or desktop computer. In other embodiments the system or platform operating the application layer protocol is a fixed device such as an appliance like a microwave or a refrigerator or television.

In other embodiments, the system or platform operating the application layer protocol is a virtual device such as a user account accessing the application layer protocol through a platform that does not necessarily host the application layer protocol. In some embodiments, a virtual device does not host the application layer protocol but nonetheless supports it, or supports card elements. For example, in one embodiment a virtual device is a barcode, such as Universal Product Code (UPC) or Quick Response Code (QR™), that stores a card element; a device with a barcode scanner may access the virtual device to acquire a card element stored in the bar code data pattern. For example, according to one embodiment, a device may scan the barcode affixed to a television and access a card element of the television with product information such as warranty information.

In certain embodiments, not every system supports the application layer protocol. Embodiments of the disclosure may still interact with these systems, but acquiring card elements for those systems is from third party providers, such as a card element store or cloud databases, or preconfigured card elements. For example, a home theater device may not support an application layer protocol, but a system that does operate the application layer protocol may receive or access a card element for remote control of that home theater device from a third party and operate the home theater device from the system by accessing and replicating a remote control application program interface (API) card element associated with the home theater device. Card elements thus enable communication and exchange of information between systems that are not programmed with common communication protocols.

The aforementioned examples of platforms and systems supporting the application layer protocol or supporting methods and access to card elements related to a platform or system are illustrative only and not exhaustive, one having skill in the art will envision other systems appropriate for supporting access and exchange of card elements given the embodiments provided by this disclosure.

A card element in one embodiment is accessed through an interface on a system. In one embodiment, a card element is a data packet representing the intrinsic capabilities of the system hosting the card element. In another embodiment a card element represents the operations and control of the system hosting the card element. In other embodiments, a card element is an exchangeable data packet enabling remote control of the system from an external system that has the same card element either by a receiving method according to one or more embodiments described herein, or from pre-configuration of a system placing the relevant card element on the system. In other embodiments, the card element is a content collection representing a variety of information such as documents, media files to include photographs, device information like warranty, contact information, calendar information and events, or greeting cards. In other embodiments the card elements are function based, representing information such as maps and driving directions, health monitors and fitness trackers, or interactive games. These examples are not exhaustive and are intended merely to illustrate the various types of data a card element may represent according to various embodiments of the present disclosure.

In one embodiment, a card element is a unit of exchange between devices, systems and sources supporting card elements, creating a virtual economy in card elements. According to one or more embodiments, a card element may be pushed from one system to another (in other words, a first system delivers the card element to a second system), pulled from one system to another (in other words, a second system requests the card element from a first system and receives the card element from the first system), or borrowed from or loaned between systems (in other words, the second system accesses the card element of the first system for a limited duration).

Exchange of card elements can further be classified as a copy exchange or a move exchange according to various embodiments. In one embodiment, exchange is a copying function wherein the exchanged card element is present on all systems party to the exchange. In another embodiment, exchange is a move function wherein the card element is relocated to another system party to the exchange and removed from at least one system party to the exchange following the exchange.

In one embodiment, the card element is a control card configured to provide the settings controls for unique and persistent functionalities of a system supporting the control card element. According to various embodiments, a control card element provides a user interface the controls for the capabilities of the system hosting the control card element by issuing the application program interface (API) to a system accessing the control card element.

In another embodiment, the card element is an interactive card element configured to provide mutable content changes to the interactive card element. According to various embodiments an interactive card element provides a user interface of a system a custom metadata packet to update the card content (such as updating items on a shopping list card element or checking into a location on a moment or event card element).

In another embodiment, the card element is a shortcut card configured to launch an application or function or intent otherwise external to the application layer protocol. For example, in one embodiment the shortcut card element launches an application located on the system hosting the shortcut card elements like an address book, or music player. In other embodiments, merely by way of example, the shortcut card element launches an application of a connected external system, such as remote controls for a connected television.

In still other embodiments, the card element is a content card configured to represent documents or other media. In one embodiment, the content card element presents a preview of the content on the content card element. In another embodiment, the content card presents the full data of the content card element. In some embodiments, the content card element is immutable and read-only to prevent changes to the data of the content card element.

According to some embodiments, a card element comprises basic attributes of the card element modeled as metadata associated with values of the card element data. Attributes of card elements include, but are not limited to, title, description, image, privacy settings, duration of access, creator, or capabilities and functions the card enables. Other embodiments enhance the basic metadata with associated data of the card element. Whereas in one embodiment the basic data of a card element is common across types of card elements (for example, content card elements and control card elements), associated data carries the specific data for the card element. For example, a plurality of content card elements in one embodiment comprise the same basic data to classify it as a content card, name the card, and provide the card creator name or date but the associated data of a single content card element within the plurality of content card elements varies to distinguish a content card element of a readable document from a content card element for a music file.

In some embodiments, the exchange of card element attributes is the basic or minimum set of data to summarize the card element and its attributes or capabilities to other systems. Subsequent exchanges augment the basic card elements data with associated data to complete the card element. In other embodiments, an initial exchange includes associated data beyond minimum representations of the card element to enable further, and in some embodiments all, functions and information access of a respective card element. According to certain embodiments, representation of data, whether basic information or augmented with associated data, is enabled by javascript object notation (JSON)

In another embodiment, card elements support commenting specific to each card element. A commenting system, according to one embodiment, enables a local system or user of a local system accessing the card element to provide a comment related to the card element. Comments embedded in a card are text comments in one embodiment, a voice audio file in another embodiment, and still other suitable formats according to alternative embodiments.

In one embodiment, the comment is device specific and only appears to the local system; that is, the comment is not readable by other connected systems and the comment does not transfer with the card element during exchanges. In other embodiments the card element comment is part of the basic data of the card element and is viewable by connected systems or the comment transfers with the card element during exchanges. In one embodiment, card element comments are cumulative and comprise all comments associated with the card element. In another embodiment, a series of filters on the card element restricts the comments accessible or viewable on a card element; potential filters for comments according to various embodiments include date of comment, identity of or relationship to the commenter, or location of the commenter. According to one embodiment, the creator of the card element may delete or edit comments embedded on a card element. In another embodiment the author of the comment may edit or delete comments embedded on a card element. In still other embodiments, a commenting master assigned to a particular card element may edit or delete comments embedded on a card element.

One embodiment is a method for exchange by delivering, or pushing, a card element from one system to another. In such an embodiment, a first system (a device in one embodiment, and a user account operating an application layer protocol in other embodiment, and still other platforms in alternative embodiments) presents at least one card element hosted by the first system to a card exchange view of an interface of the first system. The at least one card element is selected for delivery in the interface, and a card manager on the first system receives the selected card element and ensures the data of the selected card is eligible for transfer, that is, the values of the data fields comprising the representation of card element data meet requirements for transfer. In one embodiment, security compliance measures are a requirement for transfer. In another embodiment remote metadata references are a requirement for transfer. In another embodiment, sufficient population of values of data fields for card element attributes is a requirement for transfer.

In one embodiment, the card manager forwards the selected card element with at least one local metadata reference in the selected card element attribute data fields to a conversion registry module of the first system. Local metadata references are references of the card element data that refer to specific first system resources or data points. The conversion registry module identifies local metadata references of the selected card and locates a remote metadata reference for the associated reference. For example, in one embodiment the application layer protocol may store local metadata references on external sources to create and/or use a remote metadata reference. In other embodiments, the local reference itself may name a remote reference associated with the local reference. The conversion registry module translates the local reference to a remote reference to create and/or use a remote uniform resource identifier (URI), such as a remote uniform resource locator (URL) for the reference.

In one embodiment, the card manager forwards the selected card element to a card data field population verifier (e.g., card capability verifier). The card data field population verifier analyzes the card to ensure appropriate data fields are complete for transfer. For example, if the initial delivery of the selected card is only to provide basic card information to an external system, the card data field population verifier ensures the minimum representations are present, and in remote metadata reference form. In another example, if the delivery is to send a complete card element the card data field verifier ensures all data fields are populated. In another embodiment, the delivery is for a specific capability or attribute, or the target system may only operate certain capabilities. In such an embodiment the card data field population verifier confirms the selected card element data fields for the intended capability or complementary capability of the target device are populated.

In one embodiment, a plugin module (e.g., application control plugin module) coupled to the card data field population verifier accesses and provides content necessary to populate empty values in data fields of a selected card element. In one embodiment, the plugin module is coupled to the conversion registry module to access and provide remote metadata references necessary to replace local metadata references. A plugin module may access content and references from cloud based sources, external devices, or the first system itself depending on the embodiment. Other content and reference sources are possible and the provided examples are merely illustrative and not exhaustive.

In one example of a card data field population verifier performance, the card manager forwards a card element selected for delivery to the card data field population verifier with notice that all data fields are populated. The card data field population verifier confirms all fields are populated, but notes some fields refer to local metadata references. The card data field population verifier forwards the selected card to a conversion registry module to translate the local metadata reference to a remote metadata reference. In another example, merely for illustrative purposes, the card data field population verifier receives a card element selected for delivery that comprises remote metadata references for an audio file and local metadata references for a video file. The card data field population verifier connects to the target system for delivery and recognizes the target system has audio capability but no video capability. The card data field population verifier confirms delivery status of the selected card element without converting the local metadata reference of the video file by the conversion registry module.

According to various embodiments, a card element selected for delivery may be delivered without converting local metadata references or without verifying appropriate data fields of a card element are complete for the intended attribute or target system. The selected card element is delivered "as is."

In one embodiment, delivery is via a bus or other hardwired connections between the first and external systems, and in one embodiment delivery is via a network connection such as a cloud connection or nearfield communication. In some embodiments, transferred cards whether pushed, pulled, borrowed, or otherwise exchanged require no manipulation of metadata references, local and remote or otherwise, to access the information or operate the capabilities of the exchanged card element.

In one embodiment, the receiving system of the delivered card element acknowledges the delivery by issuing a card exchange receipt to the first system. A capabilities registry of the receiving system, in one embodiment, translates any remote references to local references as needed. Translation of remote metadata references to local metadata references is similar to the translation of local metadata references to remote metadata references as described above. Local metadata reference replacement enables faster system performance, as external access to a remote reference is not needed to access, manipulate, or otherwise interact with the card element is needed.

In one embodiment previously received card element metadata, such as by previous connection and exchange with the first system, or previously hosted card element metadata of the same card element is reconciled by the application layer protocol of the receiving system to produce an updated card element incorporating the data of the delivered card element. A card manager of the receiving system then presents the delivered card element to a user interface of the receiving system.

In one embodiment, a method includes viewing card elements of external sources, such as remote devices or cloud databases of card elements. In one embodiment, a user interface of a first system displays at least one external source connected to the first device. A device manager on the first system transmits a request for capabilities to the external source or the card elements available on the external source supporting those capabilities. In one embodiment, the request for capabilities is a specific capability request, such as for remote controls of the external system; in other embodiments, the capabilities request is a request for all card elements hosted by the external source. The external source receives the capabilities request and collects the metadata of applicable card elements on the external source in a content provider of the application layer protocol. The metadata is parsed, and in one embodiment converted into a JSON array, into a card element capabilities parcel and sent to the first system.

In one embodiment, the parsed metadata for the requested card elements comprises basic information only necessary to summarize the card elements; such as type of card element, name of card element, and basic description of card element attributes. In another embodiment, the parsed metadata is all metadata, basic information and associated data, for the requested card element such that the entire data of the request card element is delivered to the first system.

In one embodiment, a capability registry coupled to the first system parses the received card element capabilities parcel into respective card elements representing the distinct card elements parsed by the external source in response to the first system's capabilities request to the external source. In one embodiment, the respective card elements are stored in a remote capabilities registry. In one embodiment, the remote capabilities registry is a temporary database for received card element data. A card manager of the first system detects the presence of the received card elements in the remote capabilities registry and presents them to the first system interface for viewing. In embodiments wherein only basic information of a card element is exchanged for viewing, subsequent requests for associated data of card elements conforms to the process outlined above to request, parse, receive, and present the associated data of card elements on the first system interface for viewing.

Other embodiments are directed to a method for receiving, or pulling, a specific card element from an external source. In one embodiment, an interface on a first system displays at least one card element of an external source according to a method for viewing card elements according to various embodiments described in this disclosure. In one embodiment, a user of the first system selects on the interface of the first system a card element of the external source for pulling. Selection in one embodiment is by engaging a "pull" or "receive" function on the interface for a displayed card element; in another embodiment the selection is by dragging or swiping the displayed card element to a section of the interface representing a request to pull the respective card element onto the first system.

In one embodiment, the interface informs a card manager of the first system of the intent to pull the selected card from the external source based on the engagement/dragging of the selected card. In one embodiment, the card manager accesses a remote capabilities registry to determine if the selected card element data is already present on the first system in the remote capabilities registry. If the selected card element data is already present, the card manager inserts the metadata for that card element to provide all functions of the selected card element and presents it to the interface on the first system.

In other embodiments, the remote capabilities register does not have the selected card element data to access all functions and data represented by the pulled card element and a request for further information of the card element is requested from the external source. In one embodiment, a request is sent to an intent handler of the first system to receive the card element data required to fully access the capabilities of the selected card element.

In one embodiment, the intent handler creates and delivers a specific request parcel (for example, "capability_uuid/content/GET" wherein "uuid" refers to the identification metadata of the selected card and "GET" refers to the command desired to acquire the card element from the external system) to the capabilities registry module. The capabilities registry module submits the request parcel to the external source. In one embodiment, the external source receives the request parcel in a capabilities registry of the external source and populates the parcel with the requested data.

Population of the requested data, in one embodiment, is from a media store of the external source or in other embodiments is from the capabilities registry of the external system. The populated parcel is returned to the first system, where the application layer protocol of the first system translates any remote references, as previously described, to local references. The first system further provides the data of the received populated parcel into associated data fields of the selected card elements and stores the now fully populated card element into a storage module on the first system. In one embodiment, the storage is in a media store of the first system, in other embodiments the storage is in a capabilities registry of the first system. The application layer protocol further delivers the fully populated card to the card manager of the first system to present to the interface of the first system, enabling a user of the first system to access the card element data.

According to various embodiments, an exchanged card element is either copied or moved by an exchange. In a copy function, whether by delivery/push or receiving/pull the card element is present on both systems following exchange. In a move function, whether by delivery/push or receiving/pull the card element, the system receiving the card element transmits an exchange receipt to a capability registry of the system that provided the exchanged card. According to embodiments implementing a move function of a card element, the exchange receipt includes a command for the capabilities registry to delete the respective card element from the capabilities registry of the system that provided the exchanged card and any other module or component hosting the respective card element. Systems that receive the delete command remove the respective card element from their registries.

In other embodiments, a card element on a first system is also present on external systems, but the card element hosted by the first system comprises information or data end points different from the information or data points on related card element of the external system. Such additional information, according to various embodiments includes version updates or modifications to content since previous connections between the first system and external system. For example, a common card element between the first system and an external system is a content card comprising a shopping list, the first system card element includes additional items for the shopping list but has removed other items that no longer need purchasing.

One embodiment is a method for updating related card elements shared across systems. The method is initiated by a control state manager on the first system delivering a capability callback protocol to at least one external system hosting the related but un-updated card element. The capability callback protocol, in one embodiment, measures updates according to date and time stamps of the card element information such that the card element representing the most recent data is the reference to update related cards. In another embodiment the capability callback protocol measures updates by a master card identification data field such that the card element assigned as the master card among related cards updates the data of the related cards to reflect the data of the master card regardless of the state of data on related cards.

In one embodiment of updating a card, a control state manager on a first system transmits a capability callback protocol with updated data fields of a card element to an external system hosting a related card element. The external system receives the capability callback protocol in a capabilities registry of the external system. The capabilities registry retrieves the card elements on the external system related to the data fields of the received capability callback protocol. Identification of the related card elements is by card element name in one embodiment, by card element capability in another embodiment, and by other mechanisms according to various embodiments. The capability registry compares the data fields of the capability callback protocol and deletes the end points of data fields on the retrieved card element that are incongruous with the endpoints of the data fields of the capability callback protocol. The capability registry populates the deleted end points with the values of the data fields in the capability callback protocol and stores the now updated card element in a storage module of the external system, such as a media store or the capabilities registry according to various embodiments.

In other embodiments, a content provider module of an application layer protocol comprises a notification protocol. A notification protocol in one embodiment transmits a notice parcel to connected systems. In one embodiment, the notice parcel includes updates to related cards between the systems. In another embodiment, the notice parcel includes new card elements of the system transmitting the notice parcel relative to the last connection between the systems.

In one embodiment, the notice parcel is received by a card manager. In one embodiment, the card manager locates card elements related to updates of the notification protocol and presents the related card element to an interface for verification of requesting updates to the related card element; confirmed requests conform to methods of updating a card element according to capability callback protocols as described above. In another embodiment, the card manager presents new card elements associated with the notification protocol to an interface for verification of pulling the new card associated with the notification protocol; confirmed requests conform to methods of pulling a card element as described above.

Referring now to the figures, FIG. 1 depicts a simplified system diagram of association 100 according to one or more embodiments. Within association 100 is device 105; device 105 may be configured to execute an application layer protocol, such as a mOX, providing one or more functions, including but not limited to viewing of card elements $106_1$, $106_2$, through $106_n$ as applicable that are present on device 105, viewing other devices 115 or 125 or external sources 130, viewing card elements hosted on other devices 115 or 125 or external sources 130, and exchanging card elements between device 105 and other devices 115 or 125 or external sources 130.

In one embodiment, association 100 between device 105 and other devices 115 or 125 or external sources 130 is through network connection 140. Network connection 140 may be a cloud computing network or other internet network connection such as Wi-Fi internet routing, a nearfield communication access point, or other suitable network connection according to various embodiments. Device 105 may alternatively connect to other devices 115 or 125 or external sources 130 through hardwire connection.

As depicted in FIG. 1, device 105 may be configured to display a collection of card elements present in association 100. In one embodiment, card elements $110_1$, $110_2$ through $110_n$ are present on device 115. The collection of card elements displayed on device 105 is from the single device 115, such that cards elements $110_1$, $110_2$ through $110_n$ are displayed on an interface of device 105.

Figure 2:
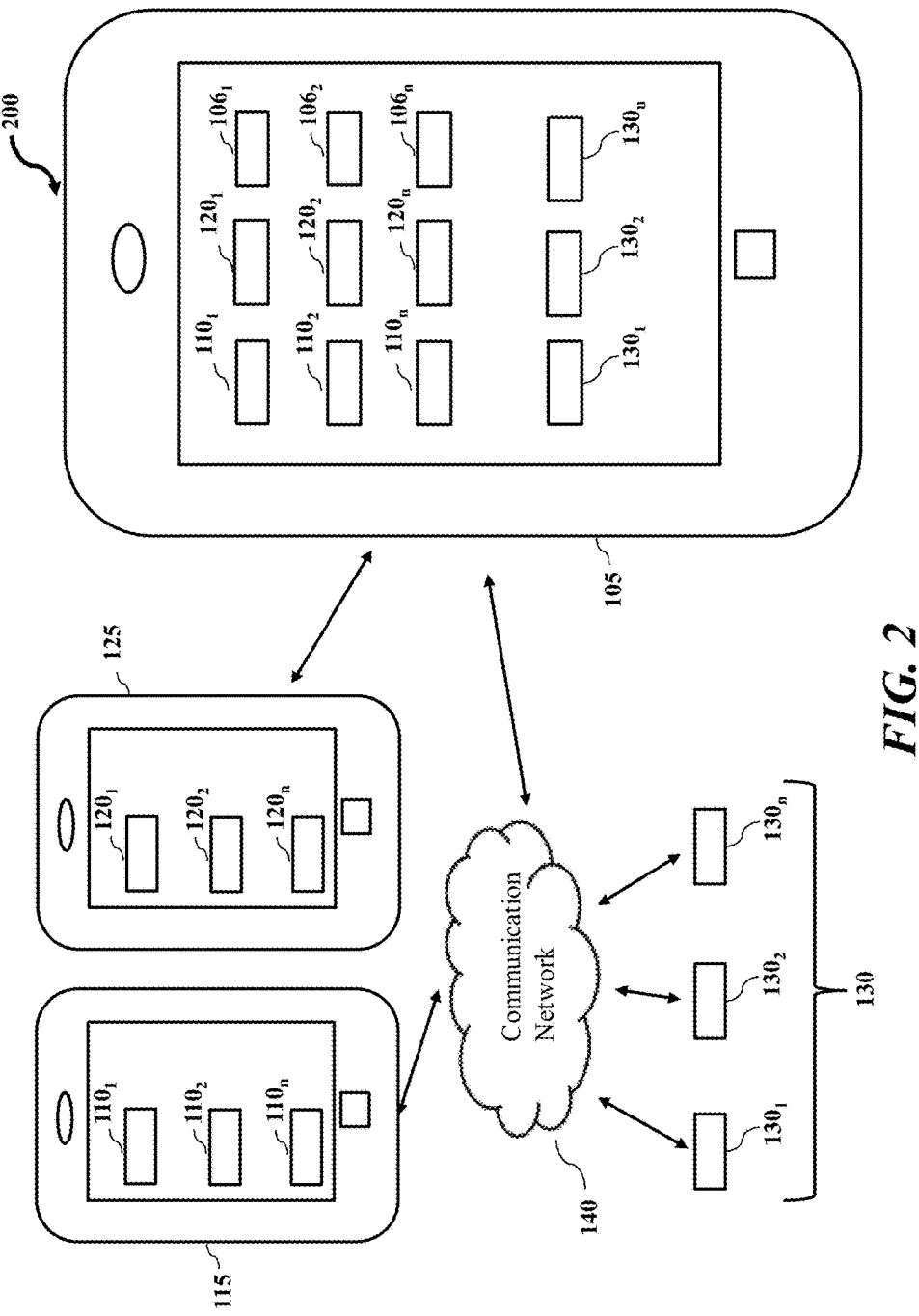
FIG. 2 depicts a simplified system diagram according to one or more other embodiments.

As depicted in FIG. 2, device 105 may be configured to display a collection of card elements present in association 100 comprising all card elements present in the association regardless of whether the card element is present on device 105, device 115, device 125 or external source 130. In one embodiment, cards elements $106_1$, $106_2$, through $106_n$, $110_1$, $110_2$ through $110_n$, card elements $120_1$, $120_2$ through $120_n$, and card elements $130_1$, $130_2$ through $130_n$ are displayed on an interface of device 105.

Figure 3:
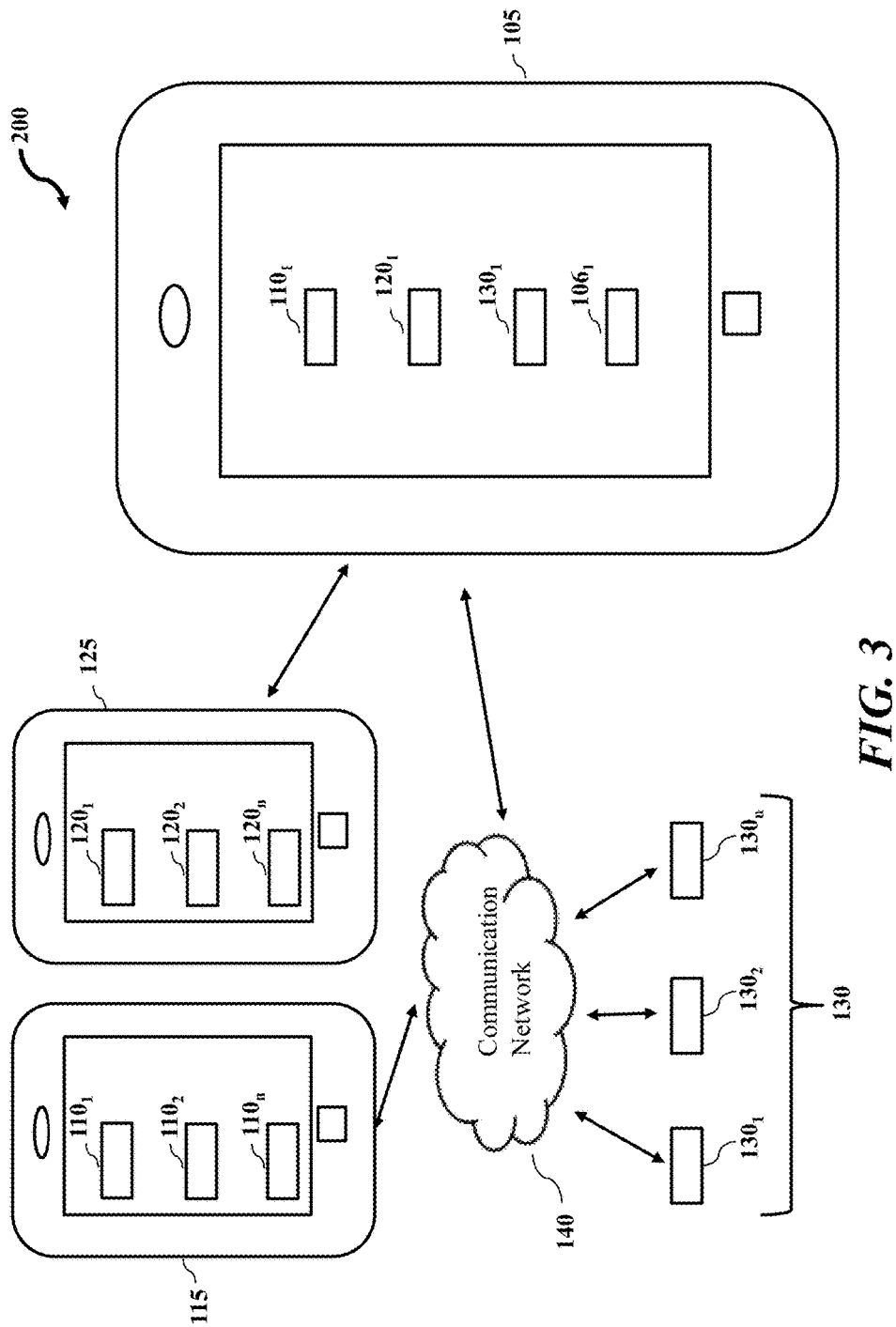
FIG. 3 depicts a simplified system diagram according to one or more other embodiments.

As depicted in FIG. 3, device 105 may be configured to display a collection of card elements present in association 100 comprising all card elements related to a particular function or card element type. Present in the association is card elements $106_1$, $110_1$, $120_1$, and $130_1$ all representing a related capability. In one embodiment, device 105 requests a card element for a particular category and accesses from association 100 those card elements related to that requested category. Device 115, device 125 and external source 130 exchange card elements with device 105 such that an interface on device 105 only displays card elements $110_1$, $120_1$, and $130_1$ respectively.

In FIGS. 1-3, device 105, as with device 115 or device 125, may be a mobile device or tablet executing an application or application layer protocol, such as the mOX. In alternative embodiments, device 105 is a virtual device such as a user account operating on a platform capable of accessing an association 100. External source 130 in one embodiment is a card element store, or a database of card elements stored on a cloud or other virtual storage means. Although FIGS. 1, 2, and 3 depict a particular number of device 105, device 115, device 125 and external source 130 it should be appreciated that association 100 and the embodiments described herein may allow for a greater or lesser number of devices and external sources to communicate and interoperate through exchanging card elements.

Figure 4:
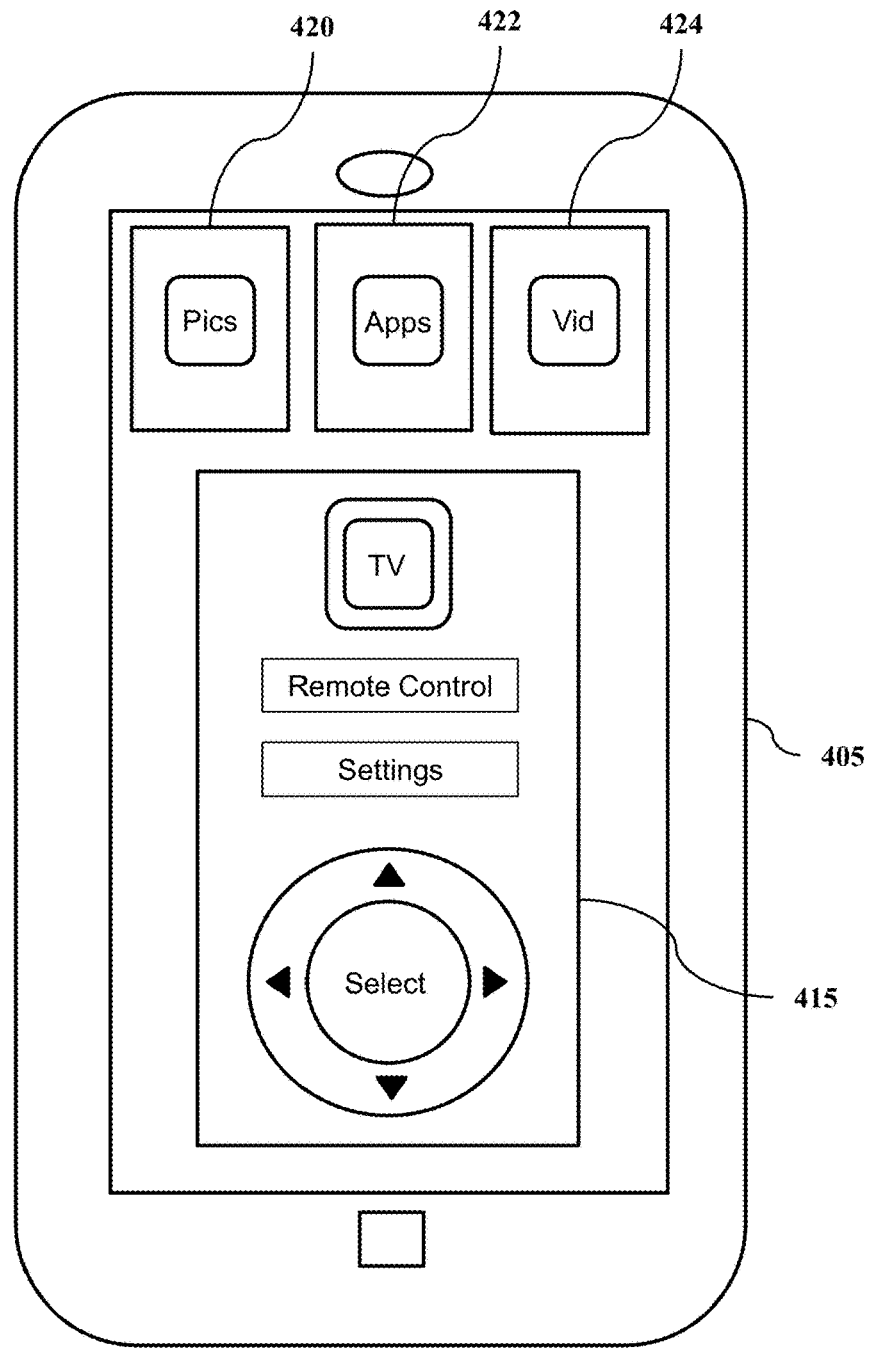
FIG. 4 depicts a user interface of a device accessing a collection of card elements according to one or more embodiments.

FIG. 4 depicts a particular embodiment for an interface on a device 405 accessing a plurality of card elements. As depicted, device 405 is connected to card elements 415, 420, 422, and 424. For illustrative purposes of the figure only and not limiting on alternative embodiments, depicted card element 415 is associated to a television connected to device 405. For illustrative purposes of the figure only and not limiting on alternative embodiments, depicted card element 420 is associated to pictures accessible by device 405. According to various embodiments, picture card element 420 may be a card element for pictures hosted on device 405, or may be pictures available on external devices, systems, or sources device 405 is connected to. For illustrative purposes of the figure only and not limiting on alternative embodiments, depicted card element 422 is associated to applications accessible to device 405. According to various embodiments, applications card element 422 may be a card element for applications hosted on device 405, or may be applications available on external devices, systems, or sources device 405 is connected to. For illustrative purposes of the figure only and not limiting on alternative embodiments, depicted card element 424 is associated to videos accessible to device 405. According to various embodiments, video card element 424 may be a card element for videos hosted on device 405, or may be videos available on external devices, systems, or sources device 405 is connected to.

Other card elements that may conform to the disclosure of FIG. 4 and the descriptions of the remainder of this disclosure. For example an additional card element for contact information may be presented on device 405, wherein the contact information card element may comprise the contact information hosted on device 405 or be the contact information on external devices, systems, or sources device 405 is connected to. Similarly, it can be appreciated that access to a card element in one embodiment is from an exchange of the card element between device 405; in other embodiments the card element simply provides access to the card element through device 405 without actually exchanging or otherwise transferring the card element.

As depicted in FIG. 4, the interface of device 405 displays card element 415 for a television that device 405 is connected to. Card element 415 in one embodiment has been transferred to device 405, either by pulling, pushing, or borrowing according to a method of the disclosures herein. In another embodiment, the card element for the television controls is hosted on the respective television and merely accessed by device 405 such that the metadata of the television card element contains no local metadata references on device 405 for the connected television. Manipulation of card element 415 in one embodiment comprises controlling the operational settings of the television; that is, card element 415 enables remote control of the television by device 405. Manipulation of card element 415 in one embodiment comprises interacting with the settings of the television for output other than direct control of the television.

Figures 5A, 5B:
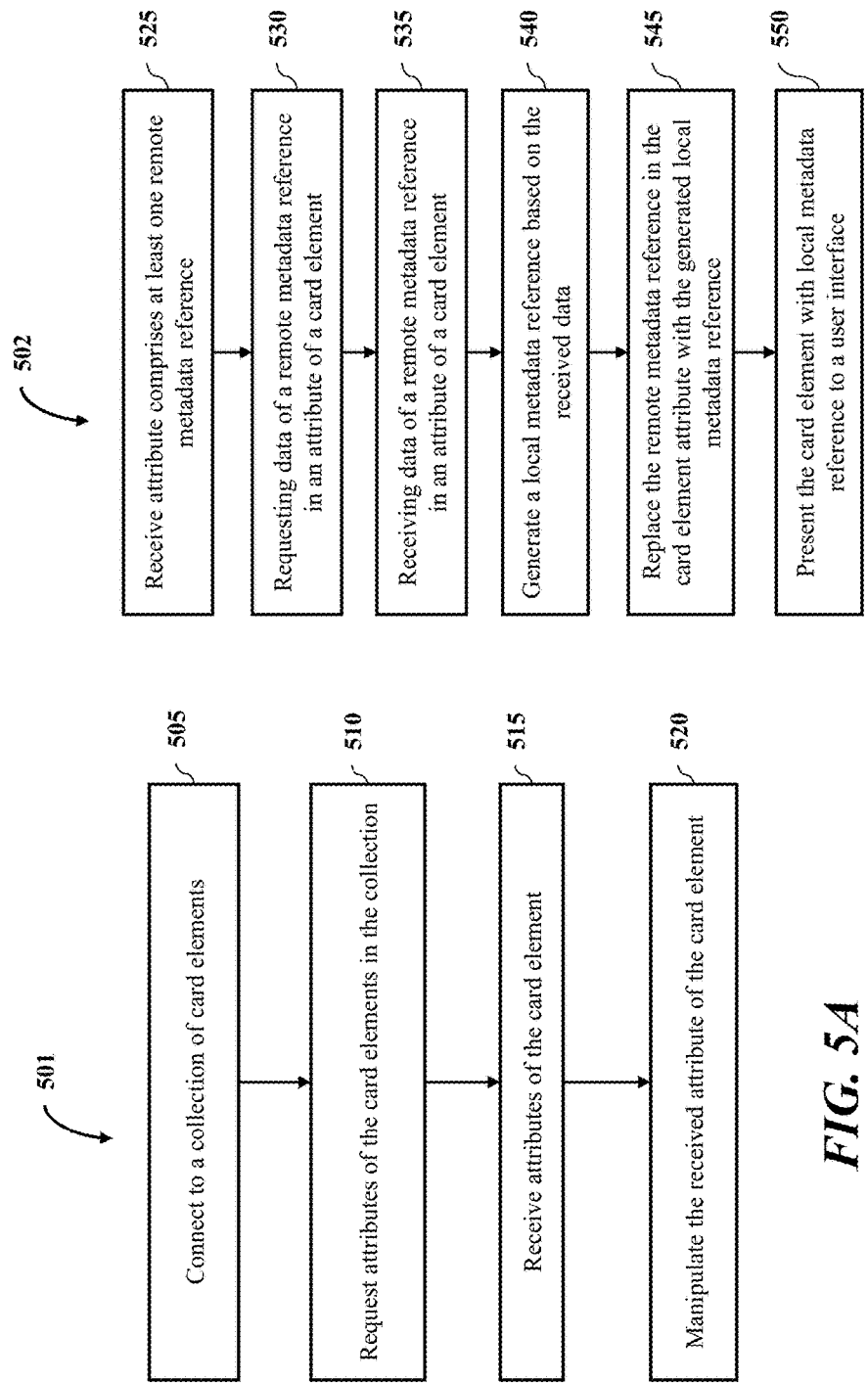
FIGS. 5A-5B depict processes according to one or more embodiments.

FIG. 5A depicts a process for receiving card elements. In one embodiment, receiving a card element is incident to a pull function of exchanging. In other embodiments, receiving a card element is subsequent to a push function initiated by an external system connected to the receiving system. Method 501 begins by connecting to a collection of card elements at 505. At 510 a request for the attributes of the collection of card elements is sent. Requested attributes in one embodiment is for a specific capability of card elements, such as particular device controls. In other embodiments the requested attributes are for all card elements in the collection. At 515 the requested attributes are received. Received attributes in one embodiment are the basic information of the card elements within the collection of card elements. Received attributes in another embodiment are the complete card element information such that reception enables complete access to the card element data. At 520 the received attributes are manipulated.

In one embodiment, manipulation at 520 is interaction with the card element such as accessing the content of the card element. In another embodiment, manipulation at 520 is accessing the controls, such as through an application program interface, of a device hosting the card element related to the received attribute. In another embodiment, the received attributes are the basic information of the card element only and manipulation at 520 is a further request for associated data of the card element to enable complete access to the card element related to the received attributes. In such an embodiment, method 501 repeats to acquire the associated data for the card element.

In still other embodiments, the received attributes comprise a mix of local and remote metadata references and manipulation at 520 is directed to acquiring local metadata references only and initiates method 502 as depicted in FIG. 5B. Method 502 begins at 525 by receiving attributes comprising at least one remote metadata reference. A remote metadata reference of a card element attribute requires external connection to fully access the related card element. To provide a holistic access to the received card element, method 502 continues to 530 to request data representing the remote metadata reference. Step 530 may be directed internally to a device running method 502, or may directed to an external source to determine the nature of the remote metadata reference according to the embodiment. At 535 the data is received to enable converting the remote metadata reference to a local metadata reference. Generating the local metadata reference occurs at 540, and at 545 the remote metadata reference of the attribute is replaced with the generated local metadata reference. The card element, with local metadata references only is presented to an interface at 550.

As an example, and for illustrative purposes only, of method 502, a card element for document containing a link to a picture hosted on the internet is received by a mobile device. The internet link is recognized as a remote metadata reference. A request to acquire the photo of the link produces a download of the linked photo onto the mobile device where it is stored. The mobile device generates a local metadata reference for the downloaded photograph and replaces the remote reference (the internet link) with the local reference (the mobile device storage location of the same photo). The card element is then presented to an interface of the device, where accessing the card element permits reading the document and the photo embedded in the document without having to access the internet to recover the embedded remote reference photo.

It should be appreciated that the specific steps illustrated in FIG. 5A provides a particular process 501 of receiving and manipulating a card element. It should also be appreciated that the specific steps illustrated in FIG. 5B provides a particular process 502 of replacing local metadata references with remote metadata references and presenting a card element with local metadata references on an interface. Other sequences of steps in process 501 or process 502 may also be performed according to alternative embodiments. For example, alternative embodiments of the present disclosure may perform the steps outlined above in a different order. Moreover, the individual steps illustrated in FIGS. 5A and 5B may include multiple sub-steps as appropriate to the individual step. Furthermore, additional steps may be added or removed depending on the particular applications. One of ordinary skill in the art would recognize many variations, modifications, and alternatives.

FIG. 6 depicts method 601 for delivering, or pushing, a card element to a target system. Method 601 is initiated at 605 by connecting to at least one other system. In one embodiment, the other system operates an application layer protocol, such as mOX. At 610 an interface on a first system displays at least one card element hosted on the first system, the at least one card element displayed is selected on the interface for delivery. At 615, the selected card is submitted by the interface to a card manager on the first system.

The card manager analyzes the selected card element at 620. Analysis by the card manager, in one embodiment reviews the data fields and end point values of the data fields to ensure each field is complete and delivery of the card element will not transfer an incomplete card. In another embodiment, analysis by the card manager at 620 ensures the card is eligible for transfer; in other words there are no security restrictions of the card element precluding transfer to another system. In still other embodiments, the card manager communicates with the target device to ensure compliance of the card element with the target system. In yet another embodiment, the card manager analyzes the card element to identify any local metadata representations as explained further in method 602 below.

At 625 the card manager submits the analyzed card element if it is eligible for transfer to a transport mechanism of the first system. In one embodiment the transport mechanism is a network connection to the target system. In another embodiment the transport mechanism is a hardwire connection to the target system. In one embodiment, if the selected card is not transferable, for other than security or local metadata representation reasons, the card manager accesses a capabilities registry to update data fields necessary for delivering a complete card element. In one embodiment, at least one attributed of the analyzed card is delivered to the target system at 625. Attributes delivered may include the complete card element, or may comprise basic information of the card element, or may comprise other information according to various embodiments.

A method for resolving local metadata representations of card elements selected for delivery to a target system is depicted in FIG. 6B as method 602. Method 602 is initiated by a card manager comparing the metadata representations at 630 of a selected card to a capabilities registry on the first system to determine if any local metadata representations are present on the selected card element. If no local metadata representations are detected, the card manager submits the card element to a transport mechanism assuming other delivery eligibility requirements are met. If local metadata representations are detected at 635, the capabilities registry of the first system locates a remote metadata reference, either on the first system itself or on external sources, and imports it to the card element. The local metadata representation is replaced at 645 with the remote metadata representation and the selected card is forwarded to a transport mechanism for delivery to the target assuming other delivery eligibility requirements are met.

It should be appreciated that the specific steps illustrated in FIG. 6A provides a particular process 601 of delivering a card element to a target system. It should also be appreciated that the specific steps illustrated in FIG. 6B provides a particular process 602 of replacing local metadata references with remote metadata references incident to delivering a card element. Other sequences of steps in process 601 or process 602 may also be performed according to alternative embodiments. For example, alternative embodiments of the present disclosure may perform the steps outlined above in a different order. Moreover, the individual steps illustrated in FIGS. 6A and 6B may include multiple sub-steps as appropriate to the individual step. Furthermore, additional steps may be added or removed depending on the particular applications. One of ordinary skill in the art would recognize many variations, modifications, and alternatives.

Figure 7:
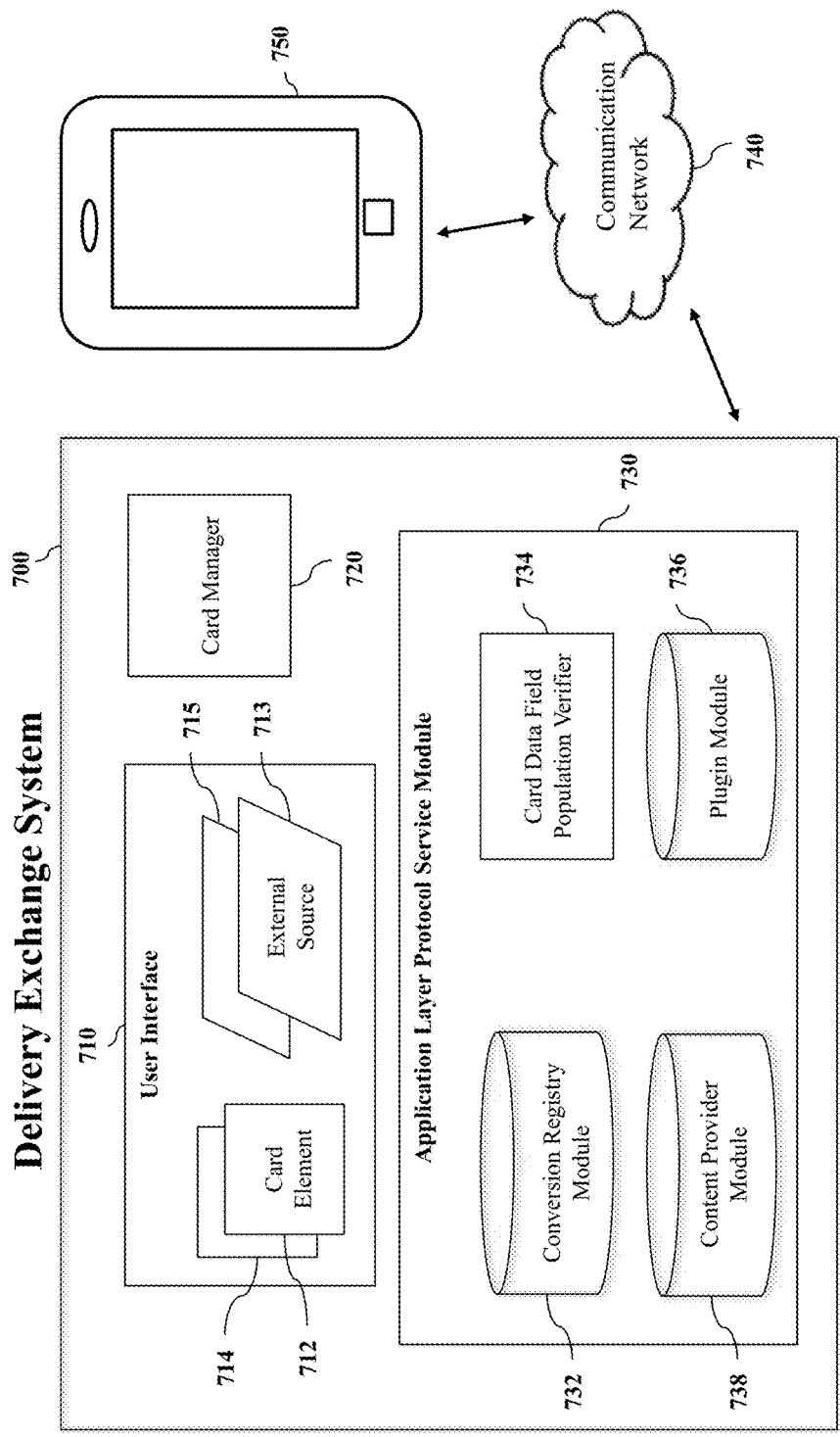
FIG. 7 depicts a block diagram of a system according to one or more embodiments.

An embodiment of a delivery exchange system 700 configured to deliver, or push, data, in the form of a card element is depicted in FIG. 7. Coupled to delivery exchange system 700 is communication network 740, and at least one connected system 750. In one embodiment, network 740 is an internet network such as local area network (LAN), wide area network (WAN) or cloud access point; in other embodiments communication network 740 is a hardwire connection to and between external sources. In certain embodiments, communication network 740 comprises both an internet network and a hardwire connection. Connected system 750 is a mobile device in one embodiment, in other embodiments external source is a fixed device such as an appliance or fixture. In still other embodiments, connected system 750 is a virtual device such as a user account.

In one embodiment, delivery exchange system 700 further comprises user interface 710, card manager 720, and application layer protocol service module 730.

In one embodiment, user interface 710 enables an exchange view displaying at least one card element 712. According to various embodiments, additional card elements 714 are displayed on the exchange view of user interface 710. In another embodiment, the exchange view of user interface 710 displays at least one external source 713. According to various embodiments, additional external sources 715 are displayed on the exchange view of user interface 710. According to one embodiment, connected system 750 is represented as at least one external source 713 or additional external sources 715. In one embodiment, the at least one card element 712 or additional card elements 714 are those present on the platform supporting data exchange system 700. In another embodiment, the at least one card element 712 or additional card elements 714 are those present on connected external sources.

A user of delivery exchange system 700 may select from user interface 710 at least one delivery card element from either at least one card element 712 or additional card element 714 to push to another system, device, or in one embodiment connected system 750. Selection of a delivery card element in one embodiment may be through clicking and dragging, or swiping, the delivery card element to a relevant portion of user interface 710. In another embodiment, selection of a delivery card element is by highlighting the delivery card element and engaging a delivery function from a menu of options in user interface 710. In one embodiment, a menu of options includes a desired action (such as "push"); a menu of options in another embodiment includes the target system, such as connected system 750, for a desired action.

In one embodiment, card manager 720 is coupled to user interface 710 and receives the selected delivery card element from user interface 710. In one embodiment, card manager 720 analyzes the delivery card element for transferability eligibility. Transfer eligibility in one embodiment reviews security aspects of the selected card element to ensure there is no data on the selected card element subject to security controls precluding transfer of the selected card element.

Transfer eligibility in another embodiment reviews the data fields of the selected card element and verifies the end point values of the data fields of the selected card element are complete to ensure delivery of the card element will not transfer an incomplete card. In yet another embodiment, the card manager analyzes the selected card element to identify any local metadata representations embedded in the card.

In one embodiment, delivery exchange system 700 further comprises application layer protocol service module 730. Coupled to application layer protocol service module is conversion registry module 732 configured to receive a selected card element card manager 720 has identified contains local metadata representations embedded in the selected card element. Conversion registry module 732 locates data fields of the selected card element populated with references to specific resources, or other local metadata representations, on the platform supporting delivery exchange system 700. Conversion registry module 732 locates remote references, such as through internet access by communication network 740, to replace the local metadata representations of the selected card element. In one embodiment, application layer protocol service module 730 further comprises plugin module 736 (e.g., application control plugin module).

Plugin module 736 locates and provides a remote metadata reference for card elements selected for delivery populated with local remote metadata references. Conversion registry module 732 translates the local metadata reference to a remote metadata reference to create a remote uniform resource identifier (URI), such as a remote uniform resource locator (URL), for the previously local metadata reference.

In one embodiment, card manager 720 forwards the selected card element to a card data field population verifier 734 (e.g., card capability verifier) coupled to application layer protocol service module 730 to address discrepancies, if any, in the end points of the selected card element. Card data field population verifier 734 confirms the populations of data fields are suitable for transfer. In one embodiment, the card data field population verifier 734 communicates with the target device to determine the capabilities of the target device and which data fields of the selected card element require population. For example, if a target device hosts certain applications and other card elements present on the target device that can populate an empty data field of a delivered selected card element, card data field population verifier 734 will not impede delivery of the selected card element.

In another embodiment, the nature of the deliver dictates performance of card data field population verifier 734. For example, delivery of card element's basic information only will not require population of data fields related to associated data and card data field population verifier 734 confirms the minimum representations are populated. If delivery of a selected card element is intended to deliver associated data, card data field population verifier 734 ensures associated data fields are populated.

In still other embodiments, the card data field population verifier 734 communicates with the target device to ensure compliance of the card element with the target system. For example, in one embodiment a contact information card is selected for delivery to a toaster appliance that does not host the capabilities embedded on the selected contact card element; the card data field population verifier 734 returns the card to card manager 720 to confirm delivery of the selected card element to the noncompliant device.

In one embodiment, plugin module 736 imports values to a selected card element for any missing values of a data field identified by card data field population verifier 734. Imported values in one embodiment are through communication network 740. Imported values in another embodiment are from other card elements accessible by delivery exchange system 700, such as card elements 714.

The selected card element, after verified for transfer eligibility by card manager 720, fully populated by actions of card data field population verifier 734, and with translated local references to remote references by conversion registry module 732 is then delivered to an external system such as external device 750. In one embodiment, delivery is via communication network 740, though one having skill in the art will envision other delivery methods.

In one embodiment, content provider module 738 recognizes device 750 as a previously connected device that exchanged card elements with delivery exchange system 700 and initiates a notification protocol to update card elements on the connected device 750. Content provider module 738 delivers a notice parcel comprising updates to card elements stored in content provider module 738 shared by connected device 750. The notice parcel delivers updated attributes of card elements to connected device 750.

Figure 8:
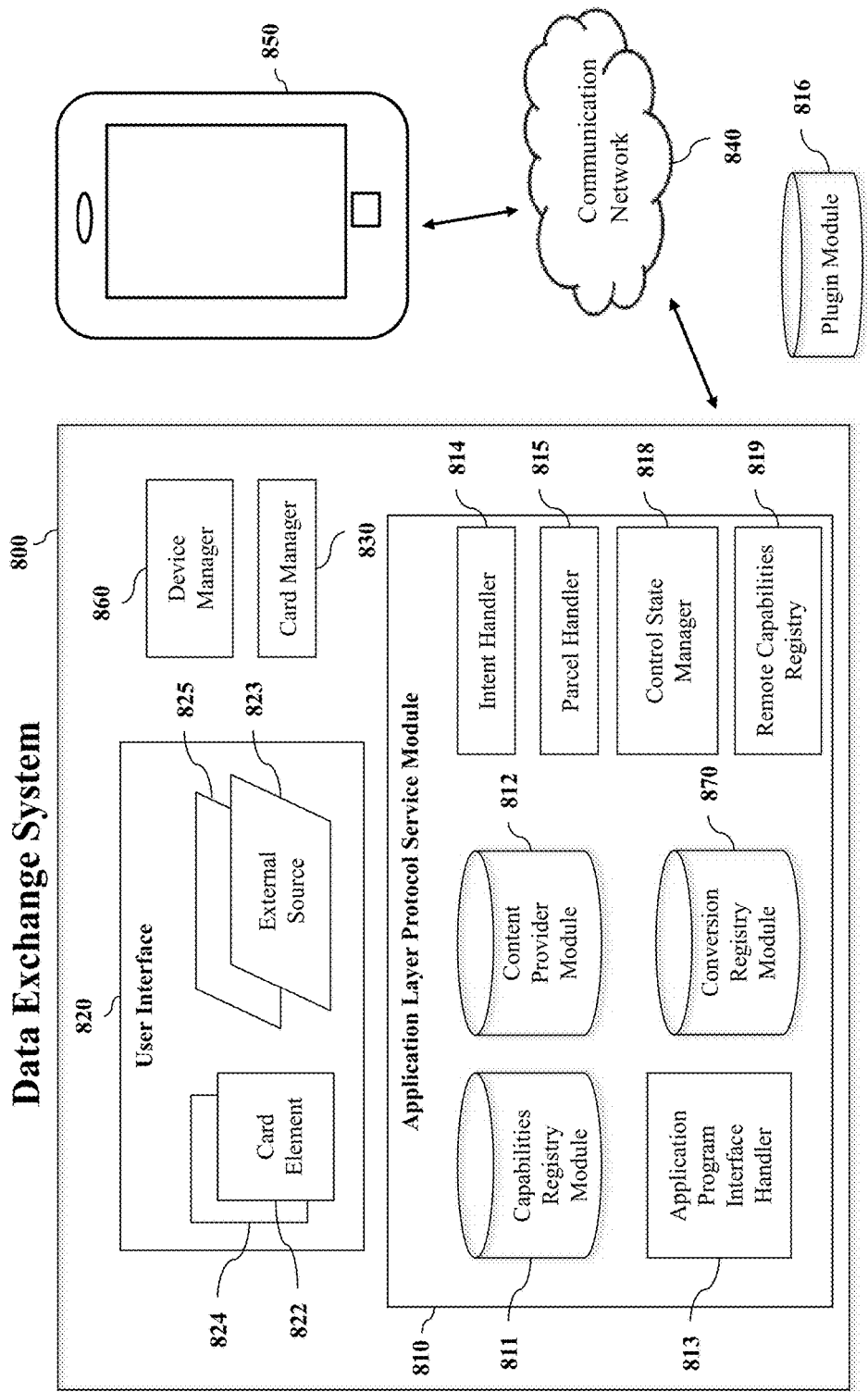
FIG. 8 depicts a block diagram of a system according to one or more embodiments.

FIG. 8 illustrates data exchange system 800, configured to receive a card element, whether through a pull function or as the recipient of a push function. Coupled to data exchange system 800 is communication network 840, and at least one connected system 850. In one embodiment, communication network 840 is an internet network such as a local area network (LAN), a wide area network (WAN) or cloud access point; in other embodiments communication network 840 is a hardwire connection to and between external sources. In certain embodiments, communication network 840 comprises both an internet network and a hardwire connection. Connected system 850 is a mobile device in one embodiment, in other embodiments external source is a fixed device such as an appliance or fixture. In still other embodiments, connected system 850 is a virtual device such as a user account.

In one embodiment, data exchange system 800 comprises user interface 820, card manager 830 and application layer protocol service module 810. The description for user interface 710 as depicted in FIG. 7 is applicable to user interface 820, wherein user interface 820 similarly comprises an exchange view; the description of at least one card element 712 applicable to at least one card element 822; the description of additional card elements 714 applicable to additional card elements 824; the description of at least one external source 713 applicable to at least one external source 823; and the description of additional external sources 715 applicable to additional external sources 825.

In one embodiment, at least one card element 822 or additional card elements 824 are displayed on user interface 820 pursuant to a card element request sent to, and received from, connected system 850. Device manager 860 transmits a request to connected system 850 for card elements or capabilities represented by card elements to connected device 850.

In one embodiment, capabilities registry module 811 is coupled to application layer protocol service module 810. Capabilities registry module 811 receives the card elements or capabilities represented by card elements from connected device 850. Capabilities registry module 811 parses the received card elements or card element capabilities into individual card elements and stores them in remote capabilities registry 819 coupled to application layer protocol service module 810. In one embodiment, remote capabilities module 819 periodically removes stored received card elements; in other embodiments remote capabilities module 819 permanently stores received card elements.

In one embodiment, application layer protocol service module 810 detects the presence of a received card element in remote capabilities registry 819 and presents received card element to user interface 820. In one embodiment, a user of data exchange system 800 initiates a pull request to receive a card element presented in user interface 820. Similar to a push function, a pull request in one embodiment is by dragging or swiping a card element to a particular portion of user interface 820; in other embodiments a user engages a function option on user interface 820 such as "pull," "receive," or "acquire."

In one embodiment, user interface 820 sends a request to card manager 830 to acquire the card element selected for pull from connected device 850. In one embodiment, card manager 830 accesses remote capabilities registry 819 to determine if the requested card element is already present in remote capabilities registry 819. If the requested card element is present in remote capabilities registry 819, card manager 830 transports the requested card element to user interface 820 for the user of data exchange system 800 to access the requested card element.

In one embodiment, the request card element is not present in remote capabilities registry 819 and card manager 830 initiates a request to acquire the card from connected device 850. Initiation of acquisition from connected device 850 begins by card manager 830 directing the request to intent handler 814 coupled to application layer protocol service module 810. Intent handler 814 delivers the request to capabilities registry module 811 with a request parcel command. In one embodiment, request parcel conforms to a "GET" command. Capabilities registry module 811 submits the request parcel to connected device 850.

In one embodiment, parcel handler 815 coupled to application layer protocol service module 810 receives the returned parcel from connected device 850. A conversion registry module 870 coupled to parcel handler 815 translates any remote metadata references of the received parcel to local metadata references. In one embodiment, plugin module 816 coupled to application layer protocol service module 810 facilitates translation of metadata references.

In one embodiment, content provider module 812 coupled to application layer protocol service module 810 parses the data of received populated parcel into a card element. Remote capabilities registry 819 stores the populated card element for temporary storage. In other embodiments the populated card element is stored in capabilities registry module 811. Application layer protocol service module 810 delivers the populated card element to card manager 830 for presentation on user interface 820.

In another embodiment, application program interface (API) handler 813 coupled to application layer protocol service module 810 receives API data from parcel handler 815 to parse API instructions for a received card element. API handler 813 delivers the API instructions to the system hosting data exchange system 800 to enable remote interaction of connected device 850 through the received card element. In other embodiments of a control card element enabling remote control of connected device 850, the settings are the only attributes of the received card element such that user interface 820 is presented with the setting controls but not the direct API of connected device 850. In this embodiment, remote control of the card element hosted on connected device 850 is enabled, rather than direct remote control by API manipulation.

In another embodiment, control state manager 818 is coupled to application layer protocol service module 810. Control state manager 818 delivers a capability callback protocol to connected device 850. Capability callback protocol requests updates to attributes of any previously acquired card elements from connected device 850. Updates to card elements are received by parcel handler 815. Control state manager 818 receives the updates to previously acquired card elements; in one embodiment control state manager 818 forwards the updated attributes to remote capabilities registry 819 to populate previously acquired card elements stored there. In other embodiments control state manager 818 forwards updated attributes to content provider module 812 to populate previously acquired card elements stored there.

In one embodiment, content provider module 812 recognizes device 850 as a previously connected device that exchanged card elements with data exchange system 800 and initiates a notification protocol to update card elements on the connected device 850. Content provider module 812 delivers a notice parcel comprising updates to card elements stored in content provider module 812 shared by connected device 850. The notice parcel delivers updated attributes of card elements to connected device 850.

Figure 9:
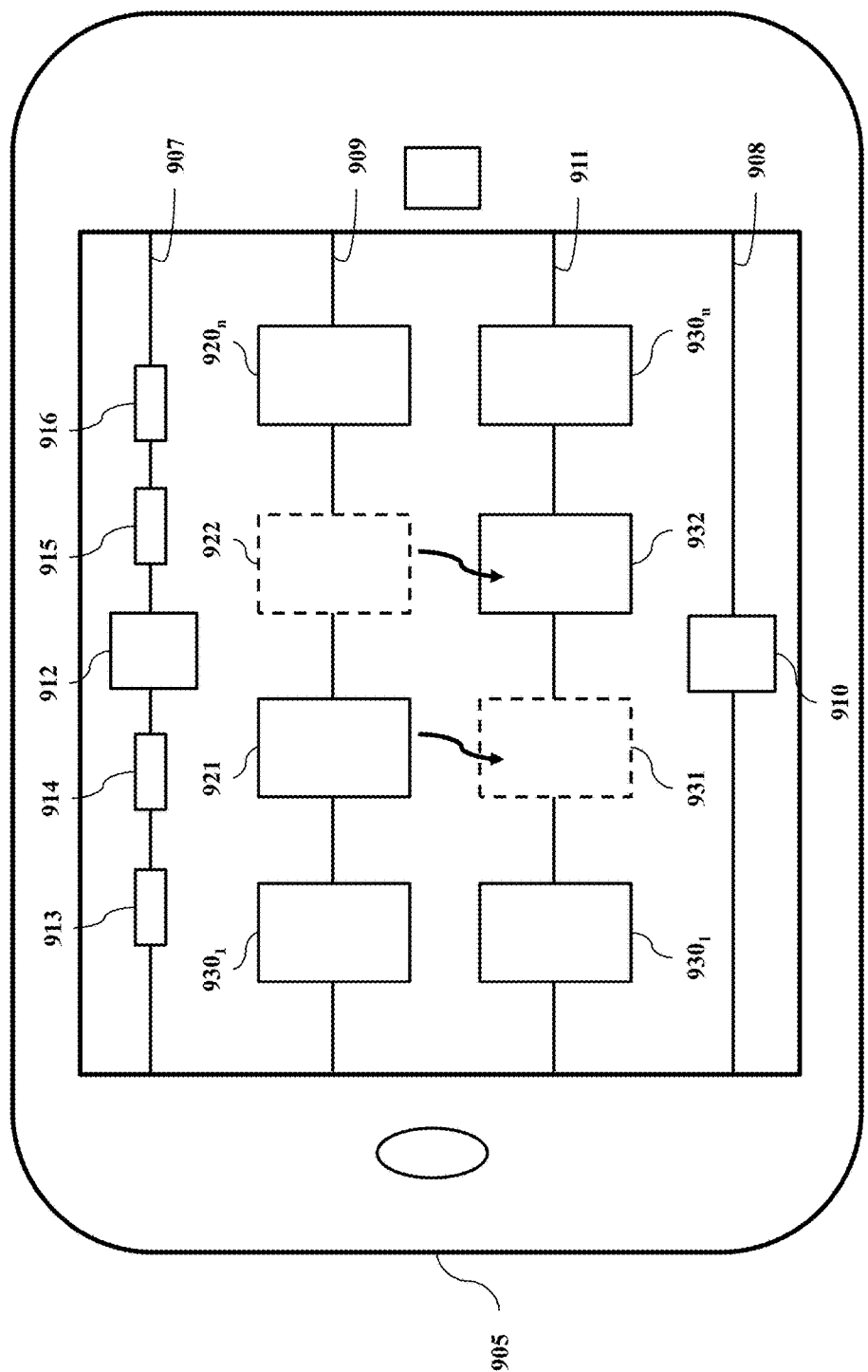
FIG. 9 depicts a user interface according to one or more embodiments.

FIG. 9 is an exemplary depiction of a copy or move function according to an embodiment. FIG. 9 shows device 905 with an interface exchange view 906. Populating interface exchange view 906 is at least one external source 912 connected to device 905 in an associated device menu scroll 907 also displaying any other devices or systems connected to device 905 such as 913, 914, 915, and 916. According to various embodiments, 913, 914, 915, and 916 may be devices, fixtures, virtual devices such as user accounts, or appliances. In one embodiment, associated device menu scroll 907 only displays requested devices or systems connected to device 905. Interface exchange view 906 further depicts the system 910 currently interacted with on interface exchange view 906. In one embodiment, system 910 is device 105; in another embodiment system 910 is another device associated with a user of device 105, such as a user account or a remotely accessed device.

As an illustrative example only; a user of device 905 intends to acquire a card for another device the user owns other than device 905. The user may access the other device through device 905 according to an embodiment disclosed herein, such as by acquiring the card element for controlling downloads on the other device. Device 905 then accesses the other device, and the other device is presented on interface exchange view 906 as system 910.

In one embodiment, the interface exchange view of device 905 displays the card elements hosted by a selected external source 912 in a connected system card scroll 909. Connected device menu scroll depicts card elements $920_1$, 921, 922 and other card elements selected external device 912 may host through $920_n$. In one embodiment, only one card element is hosted on selected external device 912. In one embodiment, interface exchange view 906 displays the card elements hosted by a device 910 in a current system card menu scroll 911. Current system card scroll 911 further depicts, in one embodiment, card elements $1130_1$, and other card elements device 905 may host through $1130_n$.

In one embodiment of a copy function of a card element exchange, card element 921 is swiped, or dragged, from connected system card scroll 909 to current system card menu scroll 911 to initiate a pull of card element 921 from external source 912 to device 910. Card element 921 is reproduced onto current system card menu scroll 911 as card element 931, such that card element 921 remains on external device 912, but is replicated as card element 931 on device 910.

In an embodiment of a move function of a card element exchange, card element 922 is swiped, or dragged, from connected system card scroll 909 to current system card menu scroll 911 to initiate pull of card element 922 from external source 912 to device 910. Card element 922 is reproduced onto current system card menu scroll 911 as card element 932, but unlike card element 921 described above, card element 922 does not remain on external device 912, but is completely moved to device 910.

Figure 10:
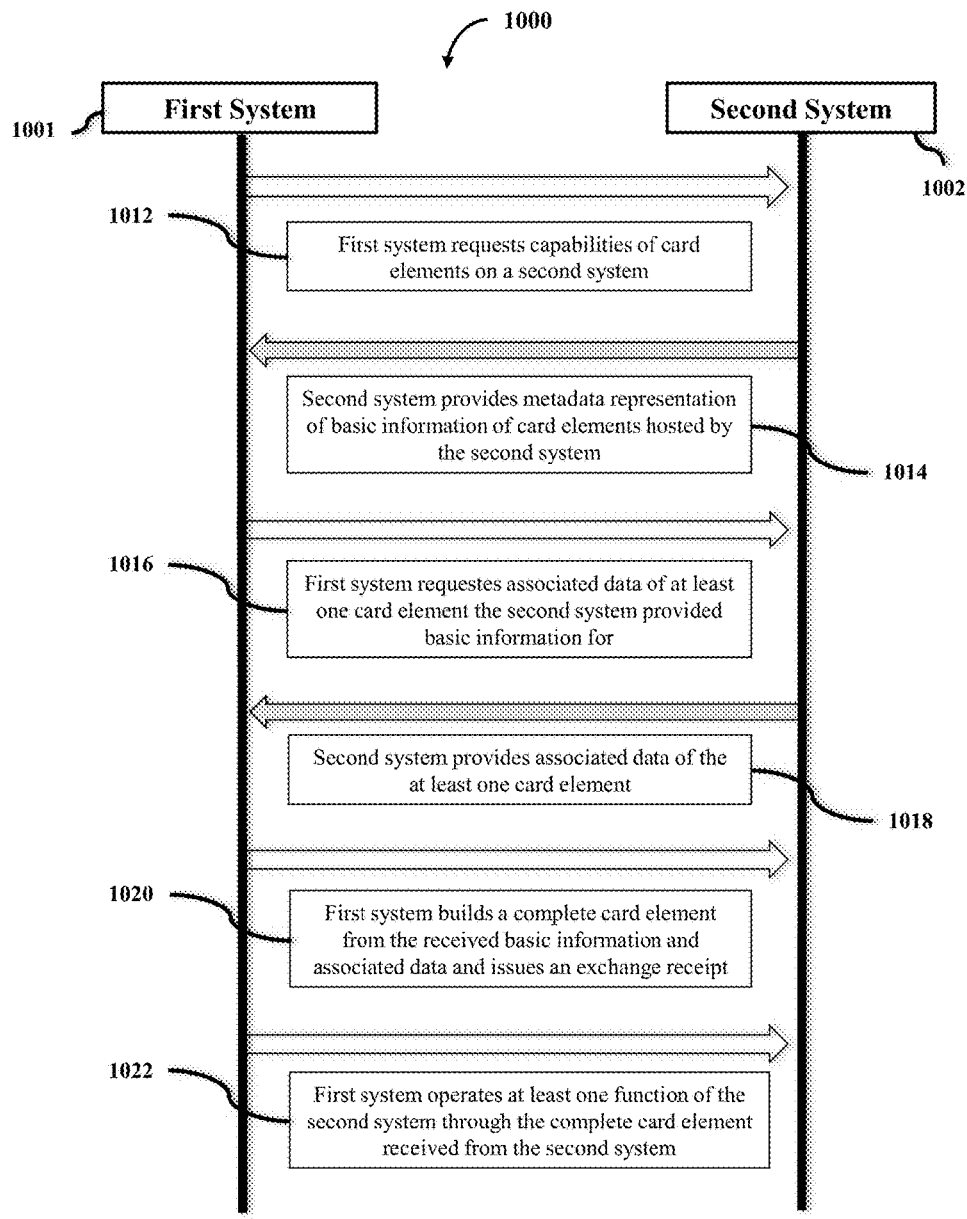
FIG. 10 depicts a exchanging card element information according to one or more embodiments.

An exemplary sequence of interaction between a first system 1001 and a second system 1002 is depicted in FIG. 10 to illustrate one embodiment of the disclosure for accessing, sharing information, exchanging card elements and operating card element attributes between devices. According to one embodiment, a first system 1001 requests the capabilities of a second system 1002 in the form of card elements at 1012. Second system 1002 may be directly connected to first system 1001 or connected via a network according to the embodiment. Second system 1002 responds to the capabilities request at 1014 by providing metadata representations of basic information of the attributes of card elements supported by second system 1002. Subsequent to receipt of the basic information, first system 1001 requests at 1016 associated data of at least one card element of second system 1002. Associated data are those attributes necessary to fully enable a particular function of a card element beyond basic card element information. At 1018, second system 1002 delivers the requested associated content to first system 1001. First system 1001 may then, in one embodiment, issue an exchange receipt to second system 1002 at 1020 and interact with the completed card element from first system 1002. In another embodiment, first system 1001 may operate functions on second system 1002 from first system 1001 at sequence 1020.

It should be appreciated that the specific steps illustrated in FIG. 10 provide a particular sequence of interaction between a first system 1001 and a second system 1002. Other sequences of steps may also be performed according to alternative embodiments. For example, alternative embodiments of the present disclosure may perform the sequences outlined above in a different order. Moreover, the individual sequence illustrated in FIG. 10 may include multiple sub-sequences as appropriate to the individual sequence, or direct sequences between different nodes than as illustrated. Furthermore, additional sequences and exchanges may be added, or certain sequences and exchanges may be removed, depending on the particular applications. One of ordinary skill in the art would recognize many variations, modifications, and alternatives.

Figure 11:
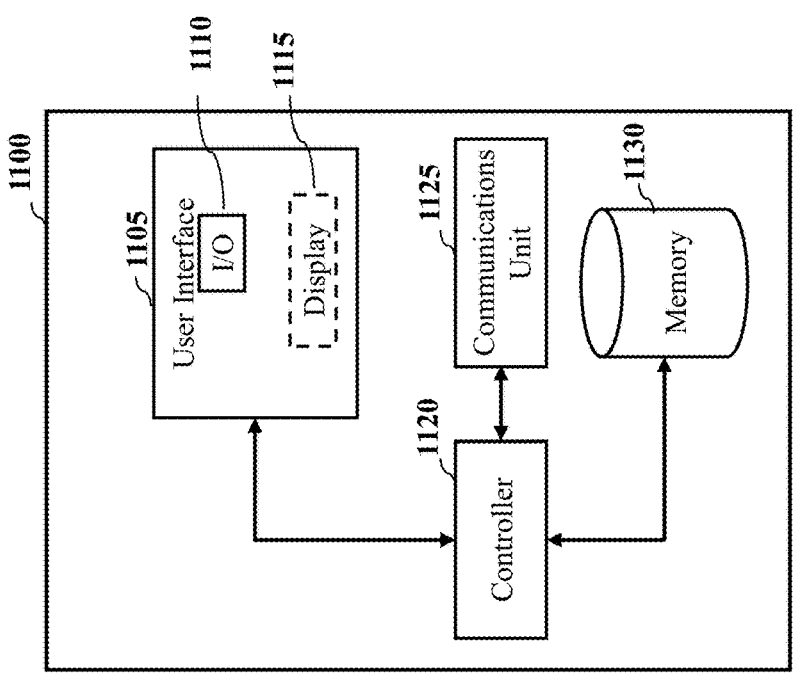
FIG. 11 depicts a simplified diagram of a device according to one or more embodiments.

FIG. 11 depicts a simplified diagram of a device according to one or more embodiments. Device 1100 may relate to one or more devices for providing an application, such as a MOX application. According to another embodiment, device 1100 may relate to one or more devices configured to run a MOX core. In one embodiment, device 1100 relates to a device including a display, such as a TV, mobile device, or device having a display in general. According to another embodiment, device 1100 may be devices, such as a set-top box, configured to output content to a display device. According to another embodiment, device 1100 may be devices without a display. As shown in FIG. 11, device 1100 includes controller 1105, graphical user interface 1110, communications unit 1115 and memory 1120.

Controller 1105 may be configured to execute code stored in memory 1120 for operation of device 1100 including presentation of a graphical user interface. Controller 1105 may include a processor and/or one or more processing elements. In one embodiment controller 1105 may be include one or more of hardware, software, firmware and/or processing components in general. According to one embodiment, controller 1105 may be configured to perform one or more processes described herein. Graphical user interface 1110 may be configured to receive one or more commands via an input/output (I/O) interface 1125 which may include one or more inputs or terminals to receive user commands. When device 1100 relates to a TV, I/O interface 1125 may receive one or more remote control commands.

Controller 1105 may be configured to run a MOX application, the MOX application including one or more card elements, restful APIs, a MOX core and a MOX configuration.

Communications unit 1115 may be configured for wired and/or wireless communication with one or more network elements, such as servers. Memory 1120 may include non-transitory RAM and/or ROM memory for storing executable instructions, operating instructions and content for display.

FIG. 14 depicts a process a graphical representation of device discovery and pairing according to one or more embodiments Device pairing may employ a DORA-RA procedure discussed in FIG. 14. Pairing and subsequent booting can be completely transparent to users of the application. A device discovery and pairing engine of the MOX application can be provide discovery and pairing of devices based on Multicast UDP broadcasts, which can operate over any physical layer supporting direct networking.

According to one embodiment, pairing may be performed for virtual devices. Virtual devices may include non-connected, or alternatively connected, devices. Virtual devices do not retain their own connectivity, or do not include MOX if they are connected. Detection of virtual devices can be handled by at least one of scanning a barcode, photo/Image recognition using a camera, manual entry, and/or near field communication (e.g., RFID, etc.). Once a device is recognized, the device appears within the interface. As such, the device may appear in the MOX user interface as a device. Virtual devices may not be controlled.

Figure 12:
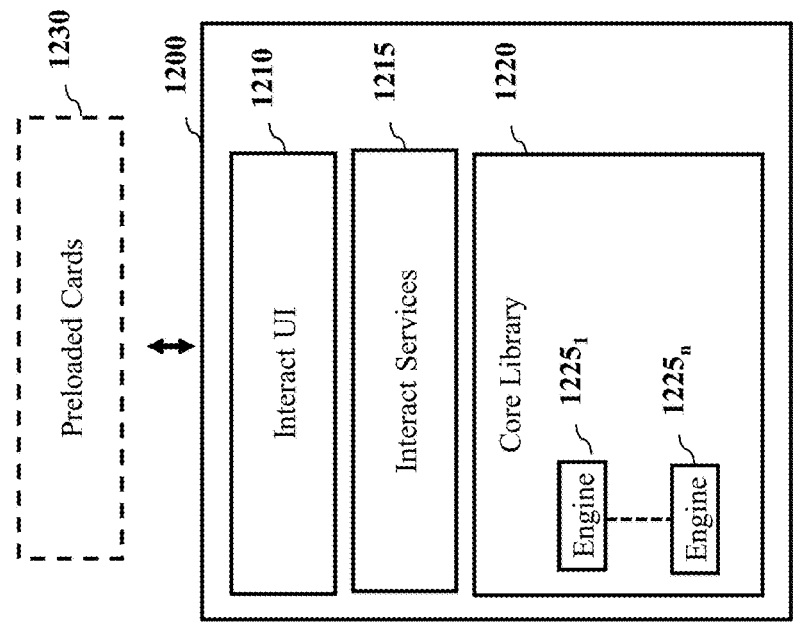
FIG. 12 depicts a graphical representation of elements/layer of an application according to one or more embodiments.

FIG. 12 depicts a graphical representation of elements/layers of an application according to one or more embodiments. In one embodiment an application as discussed herein, such as a MOX application, may be configured with one or more services/functionalities and a portable core. FIG. 12 depicts application 1200 and core elements of application 1200. According to one embodiment, application 1200 includes and interact user interface (UI) element 1210, interact services element 1215 and core library 1220. Application 1200 may be configured to run including one or more card elements, restful APIs, a MOX core 1220 and a MOX configuration.

According to one embodiment, devices may be configured to run a MOX Application based on the device type. As such, application 1200 and core computing structures may be configured for high and/or low interactive devices. Application 1200 may be configured to operate with a particular platform (e.g., android, operating system, etc.) and/or may be embedded with or without head Linux devices.

According to one embodiment, application 1200 can leverage and interoperate with existing technologies that already handle various functions, including matching capabilities by displaying complementary endpoints between devices. A capability card is only shown when two complementary functions are available, such as in DLNA (A controller and a renderer).

Interact user interface (UI) element 1210 may be a layer associated with presentation of a user interface. Certain devices may include displays and utilize a user interface for presentation of a MOX application. Accordingly, UI element 1210 may be configured to present a user interface, such as the user interface described herein for presentation of card elements, exchange of card elements and interaction with a user. For devices without a display or input/output, UI element 1210 may not be required to execute the MOX application. Accordingly, in that embodiment the MOX application may be loaded without the UI element 1210. UI element 1210 may provide smooth transparent interaction for application 1200. UI element 1210 may leverage native platform permissions to support presentation of the user interface. For example a native application service layer manager may bridge between the high level UI, and the low level system components. Interact services element 1215 may be responsible for the services and device interaction. Interact services element 1215 may contain the relevant logic to handle multiple devices.

Interact services element 1215 may be a layer associated with interaction between one or more MOX devices. Certain devices may be configured to discovery and interact with other devices using a MOX application. Interact services element 1215 may provide each devices its capabilities. By way of example, the application 1200 may be configured to notify the ecosystem and/or one or more devices associated with application 1200 when there is something to communicate. Devices associated with application 1200 can respond instantly when requested to take action. Devices within the ecosystem can be shared at the capability level.

Core library 1220 can include one or more engines 1225$_{1-n}$ configured to provide functionality or handling of data and actions within the application. According to one embodiment, core library 1220 can include one or more engines 1225$_{1-n}$ associated with at least one of a Discovery & Pairing Engine, Capability Matching Engine, Dynamic Capability Engine, and Profiling Engine. Core library 1220 can allow for the MOX application to run on both high and low level devices, including devices with user interfaces, processors and controllers, such as controllers for appliances. Core library 1220 can support multiple device types. According to one embodiment, core library 1220 does not require a particular platform to be executed, and thus, is portable for operation on many different types of platforms.

In one embodiment, application 1200 is configured with a capability matching engine to compare capabilities from a current device (e.g., device executing the MOX application 1200) and remote devices. The capability matching engine can determine complementary endpoints and functions. In certain embodiments, only complementary endpoints are presented to the upper layers of the application 1200.

In one embodiment, application 1200 is configured with a dynamic capability engine layer to automatically discover the capabilities of the device upon which it is running. The dynamic capability engine layer can support both dynamic discovery of capabilities, and a configuration file based method to support deeply integrated products.

In one embodiment, application 1200 is configured with a profiling engine layer to provide a device's identity. Rather than being a nameless device, the profiling engine layer can ensure a unique identity to the device application 1200 is running on.

In certain embodiments, the application 1200 can operate with preloaded card elements 1230. Preloaded card elements 1230 can relate to one or more card elements that are associated with a device. In that fashion the card elements may be preloaded to operate with the device without requiring loading from a server.

In certain embodiments, application 1200, and a MOX application as described herein, can include one or more security features. According to one embodiment, devices running application 1200 are configured with standard remote and guest access policies designed for security. These policies can be controlled or modified by a user based on individual needs through an interface that would allow dragging one API from the local/authenticated, or "All APIs" pool, to either the "Remote APIs" or the Guest APIs" pools. In one embodiment, an Authenticated/Local configuration can provide full API access and control to authenticated and/or remote devices. In addition, there may be a remote class API access and control setting. In one embodiment, a Not Authenticated/Local configuration provides limited local class API access and control. In one embodiment, a Not Authenticated/Remote configuration provides no access or control. According to other embodiments and with respect to API's in different zones, only a portion of a given API set would be available remotely. This can be reconfigured by from the defaults. APIs that would not be available remotely would fall into the categories of safety concerns and interactive limitations.

Figure 13:
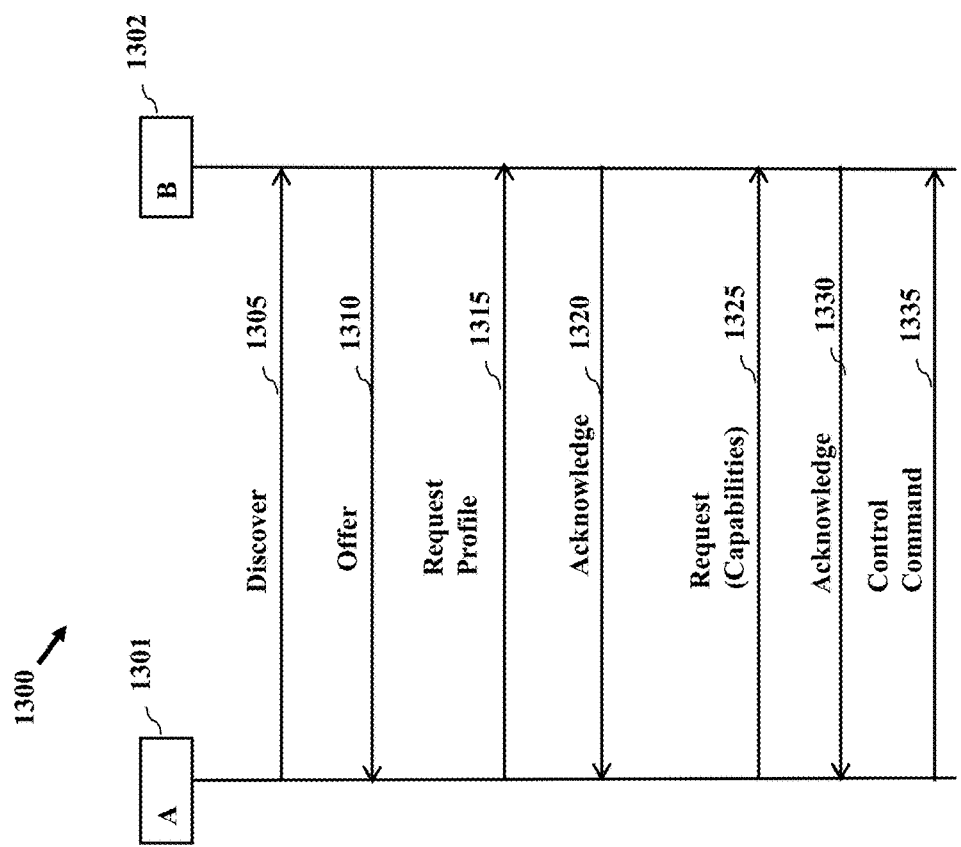
FIG. 13 depicts a graphical representation of device discovery and pairing according to one or more embodiments.

According to one embodiment, devices running an application, such as a MOX application, and/or devices executing a MOX core can allow for communication between the devices and exchange of data for one or more functions. FIG. 13 depicts process 1300 for device discovery and pairing. Discovery between devices or entities having a MOX core can allow for device capabilities and services within an ecosystem of devices running the MOX application. Process 1300 may also be employed for resource sharing.

Process 1300 may be employed by a device, such as a MOX device, to identify devices associated with one or more entities or zones. In certain embodiments, process 1300 relates to an identification of devices and services within an ecosystem, such as a personal ecosystem. According to one embodiment, each MOX device may be associated with a device class. Exemplary classes can include one or more of mobile device (e.g., smartphone, tablet, etc.), smart TV, laptop, desktop, audio device (e.g., home theater, audio system, etc.), wearable (e.g., smartwatch, fitness monitor, etc.), appliance (e.g., refrigerator, microwave, dishwasher, air conditioner, washer/dryer, oven, coffee maker, etc.), and fixture (e.g., thermostat, lighting system, security system, CO/CO2 monitors, window coverings, garage door opener, etc.). According to another embodiment, devices within the MOX application can be associated with a user account. Device profiles may be associated with user accounts including one or more of a user name, users first name, users last name, user avatar, timestamps, and user data in general.

Process 1300 is depicted relative to entities A and B, shown as devices 1301 and 1302, respectively. Process 1300 may be performed by engines and functionalities of an application executed by each of entities such as devices 1301 and 1302, such as a MOX application. Accordingly, process 1300 may be performed without necessarily requiring user input. Process 1300 may allow for devices associated with a particular account, user, location (e.g., physical, virtual, etc.), zone, or entity to exchange capabilities, pair, allow for control, etc. Transmissions/exchange messages in process 1300 may be performed by one or more of local short range communication, local network communication, network communication in general and combinations thereof. Process 1300 may be employed by two devices to communicate, and in particular, two devices that are not configured based on conventional communication protocols. By way of example, process 1300 may be employed disparate devices not traditionally designed for communication such as a refrigerator and lamp and devices with communication capabilities. Devices configured with a MOX application core can include communication capabilities via the process depicted in FIG. 13 and as described herein.

Process 1300 may relate to a conversation between devices based on the core elements included by a MOX application of each device. By way of example, process 1300 may relate to device pairing (e.g., device pairing at block 1310). Process 1300 may employ a DORA-RA process (e.g., Discover, Offer, Request, Acknowledge, Request, and Acknowledge). Device 1301 can transmit discover message 1305 which can be received by device 1302. Discover message 1305 may be sent periodically by way of local short range transmissions and/or via one or more network protocols including wired and wireless communications. Discover message 1305 may employed to determine if any devices are available for communication with entity 1301 via the application, such as a MOX application. Discover message 1305 may be transmitting by device 1301 as a discover message, the discover message is controlled by a discovery engine of an application executed by device 1301. Discover message 1305 may be a universal discovery message for devices associated with the application. In one embodiment, discover message 1305 may be a message (e.g., packet, packets, etc.) to all hosts within a local ecosystem of device 1301. According to one embodiment, in order to support virtual devices, discovery can incorporate calls to a cloud interface in order to fetch any virtual devices that have been discovered for a given user and the zone which they reside.

When discover message 1305 is received by entity 1302, offer message 1310 may be transmitted by entity 1302 to entity 1301. Offer message 1310 may provide a response to notify that another device is present. Offer message 1310 may be a response message transmitted from device 1302 and received device 1301 in response to the discover message 1305. Message 1310 may be an offer to establish a communication channel between the device 1301 and device 1302. In one embodiment, offer message 1310 may provide an answer or response (e.g., "I am here") the discover call. Offer message 1310 may occur sequentially in response to discover message 1305 and can be sent out in a unicast discover message to the originator of discover message 1305. Offer message 1310 may contain information which can be used to establish a TCP/IP socket that can be used for all subsequent communication in process 1300.

Request profile message 1315 may query a device's profile. Device 1301 transmits a request 1315 to device 1302 for a profile associated with the second device, wherein transmission of the request for the profile is controlled by a pairing engine of the application. Request profile message 1315 maybe a request for a configuration profile of the second device including a device class for the second device recognized by the application. Request profile message 1315 may follow receipt of offer message 1310 such that device 1301 can determine the location of device 1302.

Acknowledge 1320 may provide a response including the device profile that is configured according the MOX application. Process 1300 may be performed by a profiling engine of the MOX application to ensure that a device profile is present. If the profile is not complete at the time of discovery, the profiling engine can complete the broadcast. The profile can contain based information on device type and device ID. The profile may provide a contact for device 1302. Discovery and pairing of the two devices may initially be handled by UDP, while capability exchange may be handled via TCP.

Acknowledge 1320 may be received by device 1301 as an acknowledgement of the request for profile, wherein the acknowledgement of the request for profile includes identification of the second device and profile information for the second device. Acknowledge 1320 may includes a universal user identification for the second device recognized by the application and a metadata profile for the second device. Acknowledge 1320 may provide one or more messages or packets via an established connection including a metadata profile (e.g., JSON format, metadata in general, etc.). According to one embodiment, every device in the ecosystem accessible to the application will be assigned a profile to include a concise representation of the device in terms of information to uniquely identify and describe the device within the environment of the application. According to one embodiment, devices can have only a single profile provided via a configuration file. In addition to identifying data, the profile can include any static capabilities supported by the device. Profiles for a device can include one or more of a top-level object, string representation of the device identification, device class, device manufacturer, model name, human-readable name, user configured name, zone identification, defined zone in the application, uniform resource indicator to fetch capabilities and version of the application. According to one embodiment, a profiling engine of the application can be configured within the core of the application for assigning devices a unique identifier at runtime, and reading and processing configuration files.

Request capabilities message 1325 may query device capabilities. Message 1325 may be handled either lazy, or on demand if the device is selected for interaction prior to being analyzed. Device 1301 transmits request capabilities message 1325 for capabilities associated with device 1302, wherein transmission of the request is controlled by a capabilities engine of the application. Request capabilities message 1325 associated with device 1302 includes static capabilities supported by the second device and one or more capabilities stored by the profiling engine for the second device.

Acknowledge 1330 may provide a response including the device capabilities according the MOX application. Capabilities which are fetched outline what a device is capable of performing. Device 1301 receives acknowledge 1330 of the request for capabilities, wherein the acknowledgement of the request for capabilities includes one or more capabilities for device 1302. Receiving acknowledge 1330 of the request for capabilities includes at least one capability object associated with accessing an application programming interface for the second device. Acknowledge 1330 may provide one or more messages or packets via an established connection including a metadata profile of capabilities (e.g., JSON format, metadata in general, etc.). According to one embodiment, capabilities may be intrinsic, such as capabilities that are inherent to the core and nature of a product often carrying a direct dependency on the device hardware or firmware. For example, network communication abilities on a smart device, brightness control on a lamp, etc. According to one embodiment, capabilities may be extrinsic such that a device is enabled by virtue of some external contribution of third party provisioning. For example, a link to follow a user on a social media application. Capabilities may also be characterized as active and passive. Active capabilities can allow for a level of control over the capability, such as changing the level of brightness of a light, changing a TV channel, etc. Passive capabilities can have no effect on the state of a device or capability, such as sharing network access credentials, using a social media application to add a follower, etc. Capabilities can be associated with one or more devices, such as but not limited to capabilities of a mobile device (e.g., smartphone, tablet, etc.), smart TV, laptop, desktop, audio device (e.g., home theater, audio system, etc.), wearable (e.g., smartwatch, fitness monitor, etc.), appliance (e.g., refrigerator, microwave, dishwasher, air conditioner, washer/dryer, oven, coffee maker, etc.), and fixture (e.g., thermostat, lighting system, security system, CO/CO2 monitors, window coverings, garage door opener, etc.).

Device 1301 can transmit a control command 1335 to device 1302. Control command can allow for one or more directives based on device profile received and capabilities of the devices. Device 1301 may be configured to transmit a control command 1335 to device 1302, wherein the control command 1335 is formatted by the application based on the acknowledgement of the request for profile (acknowledge 1320), the acknowledgement of the request for capabilities (acknowledge 1330) received by the device 1301 and at least one plugin of device 1302. According to one embodiment, transmitting control command 1335 to device 1302 includes transmitting a command to activate a control state for device 1302. According to another embodiment, control command 1335 is to request data associated with at least one of a setting of the device 1302, control state of device 1302 and sensor output of the device 1302. Control command 1335 may be formatted by the application based in part on a plugin employed by the device 1302. Control command 1335 may be used to activate or initiate control and may be used for functions associated with of one or more of MOX device classes including but not limited to mobile device (e.g., smartphone, tablet, etc.), smart TV, laptop, desktop, audio device (e.g., home theater, audio system, etc.), wearable (e.g., smartwatch, fitness monitor, etc.), appliance (e.g., refrigerator, microwave, dishwasher, air conditioner, washer/dryer, oven, coffee maker, etc.), and fixtures (e.g., thermostat, lighting system, security system, CO/CO2 monitors, window coverings, garage door opener, etc.).

Process 1300 may be used for obtaining an IP address, and for obtaining a PXE boot image file name when the DHCP server and PXE server reside on the same physical machine. Pairing and subsequent booting are completely transparent. Discovery and pairing for two devices using process 1300 may be handled, at least initially, via UDP. Capability exchange may be handled via TCP.

Process 1300 provides resource sharing among devices. Interaction between devices 1301 and 1302 allows for a common language (e.g., MOX application), self description of device capabilities, devices can describe APIs, interactions, and capabilities. In that fashion, devices can understand complementary capabilities, and make use of related capabilities. Devices can also react to the needs of other devices. For MOX enabled devices, RESTful APIs are presented in a manner that explains what the devices do, and how they can be used. In one embodiment, devices provide the card and interaction point for control. The interaction point for control can be customized based on templates, and include branding.

FIG. 13 also depicts a method for connection and control of devices from the perspective of device 1302. By way of example, device 1302 is configured to receive a discover message 1305 from device 1301, message 1305 associated with a pairing engine of an application executed by the device 1302. Device 1302 transmits a response message 1310 to the device 1301 in response to the discover message 1305.

Device 1302 receives a request for a profile 1315 associated with the device 1302, wherein the request for the profile is controlled by a pairing engine of the application. In response, device 1302 transmits an acknowledgement of the request for profile 1320 including identification of device 1302 and profile information for device 1302. Device 1302 receives a request for capabilities 1325, wherein the request is controlled by a capabilities engine of the application. In response, device 1302 transmits acknowledgement of the request for capabilities 1330 includes one or more capabilities for device 1302. Device 1302 may receive control command 1335 from device 1301 to format by the application based on a profile and capabilities of the device 1302 and at least one plugin of the device 1302. Device 1302 may transmit control commands to device 1301.

While the disclosure has been described in terms of particular embodiments and illustrative figures, those of ordinary skill in the art will recognize that the disclosure is not limited to the embodiments or figures described. The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings and/or examples making apparent to those skilled in the art how the several forms of the disclosure may be embodied in practice.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, additional or alternative components to perform the listed functions of the given embodiments or performing multiple functions from a single component as opposed to several.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the disclosure can be practiced with modification and alteration within the spirit and scope of the appended claims. The description is not intended to be exhaustive or to limit the disclosure to the precise form disclosed.

What is claimed is:

1. A method for connection and control of devices, the method comprising:

transmitting, by a device, a discover message, wherein transmission of the discover message is controlled by a discovery engine of an application executed by the device;

receiving, by the device, a response message from a second device in response to the discover message;

transmitting, by the device, a request to the second device for a profile associated with the second device, wherein transmission of the request for the profile is controlled by a pairing engine of the application;

receiving, by the device, an acknowledgement of the request for profile, wherein the acknowledgement of the request for profile includes identification of the second device and profile information for the second device;

transmitting, by the device, a request for capabilities associated with the second device, wherein transmission of the request is controlled by a capabilities engine of the application;

receiving, by the device, acknowledgement of the request for capabilities, wherein the acknowledgement of the request for capabilities includes one or more capabilities for the second device; and transmitting, by the device, a control command to the second device, wherein the control command is formatted by the application based on the acknowledgement of the request for profile, the acknowledgement of the request for capabilities received by the device and at least one plugin of the second device.

2. The method of claim 1, wherein the discover message is a universal discovery message for devices associated with the application.

3. The method of claim 1, wherein the response message is an offer to establish a communication channel between the device and the second device.

4. The method of claim 1, the request for the profile associated with the second device is a request for a configuration profile of the second device including a device class for the second device recognized by the application.

5. The method of claim 1, wherein the acknowledgement of the request for profile includes a universal user identification for the second device recognized by the application and a metadata profile for the second device.

6. The method of claim 1, wherein the request for capabilities associated with the second device includes static capabilities supported by the second device and one or more capabilities stored by the profiling engine for the second device.

7. The method of claim 1, wherein receiving the acknowledgement of the request for capabilities includes at least one capability object associated with accessing an application programming interface for the second device.

8. The method of claim 1, wherein transmitting the control command to the second device includes transmitting a command to activate a control state for the second device.

9. The method of claim 1, wherein the control command is to request data associated with at least one of a setting of the second device, control state of the second device and sensor output of the second device.

10. The method of claim 1, wherein the control command is formatted by the application based in part on a plugin employed by the second device.

11. A device comprising:
an input/output unit configured for communication; and
a controller coupled to the input/output unit, wherein the controller is configured to control:

transmitting a discover message, wherein transmission of the discover message is controlled by a discovery engine of an application executed by the device;

receiving a response message from a second device in response to the discover message;

transmitting a request to the second device for a profile associated with the second device, wherein transmission of the request for the profile is controlled by a pairing engine of the application;

receiving an acknowledgement of the request for profile, wherein the acknowledgement of the request for profile includes identification of the second device and profile information for the second device;

transmitting a request for capabilities associated with the second device, wherein transmission of the request is controlled by a capabilities engine of the application;

receiving acknowledgement of the request for capabilities, wherein the acknowledgement of the request for capabilities includes one or more capabilities for the second device; and transmitting a control command to the second device, wherein the control command is formatted by the application based on the acknowledgement of the request for profile, the acknowledgement of the request for capabilities received by the device and at least one plugin of the second device.

12. The device of claim 11, wherein the discover message is a universal discovery message for devices associated with the application.

13. The device of claim 11, wherein the response message is an offer to establish a communication channel between the device and the second device.

14. The device of claim 11, the request for the profile associated with the second device is a request for a configuration profile of the second device including a device class for the second device recognized by the application.

15. The device of claim 11, wherein the acknowledgement of the request for profile includes a universal user identification for the second device recognized by the application and a metadata profile for the second device.

16. The device of claim 11, wherein the request for capabilities associated with the second device includes static capabilities supported by the second device and one or more capabilities stored by the profiling engine for the second device.

17. The device of claim 11, wherein receiving the acknowledgement of the request for capabilities includes at least one capability object associated with accessing an application programming interface for the second device.

18. The device of claim 11, wherein transmitting the control command to the second device includes transmitting a command to activate a control state for the second device.

19. The device of claim 11, wherein the control command is to request data associated with at least one of a setting of the second device, control state of the second device and sensor output of the second device.

20. The device of claim 11, wherein the control command is formatted by the application based in part on a plugin employed by the second device.

21. A method for connection and control of devices, the method comprising:
receiving, by a device, a discover message, wherein the discover message is received from a second device and associated with a pairing engine of an application executed by the device;

transmitting, by the device, a response message to the second device in response to the discover message;

receiving, by the device, a request for a profile associated with the device, wherein the request for the profile is controlled by a pairing engine of the application;

transmitting, by the device, an acknowledgement of the request for profile, wherein the acknowledgement of the request for profile includes identification of the second device and profile information for the second device;

receiving, by the device, a request for capabilities associated with the device, wherein the request is controlled by a capabilities engine of the application;

transmitting, by the device, acknowledgement of the request for capabilities, wherein the acknowledgement of the request for capabilities includes one or more capabilities for the second device; and transmitting, by the device, a control command to the second device, wherein the control command is formatted by the application based on a profile and capabilities of the device and at least one plugin of the second device.

* * * * *